United States Patent
Davis et al.

(10) Patent No.: US 10,415,612 B2
(45) Date of Patent: Sep. 17, 2019

(54) MODULAR FURNITURE WITH STRESSED PANEL DOVETAIL JOINT

(71) Applicant: Clark Evan Davis, Genola, UT (US)

(72) Inventors: Clark Evan Davis, Provo, UT (US); Paul Schmidt, Provo, UT (US)

( * ) Notice: Subject to any disclaimer, the term of this patent is extended or adjusted under 35 U.S.C. 154(b) by 0 days.

(21) Appl. No.: 16/051,213

(22) Filed: Jul. 31, 2018

(65) Prior Publication Data

US 2019/0040890 A1    Feb. 7, 2019

Related U.S. Application Data

(60) Provisional application No. 62/539,654, filed on Aug. 1, 2017.

(51) Int. Cl.
| | | |
|---|---|---|
| *F16B 5/00* | (2006.01) |
| *A47B 88/90* | (2017.01) |
| *A47B 47/00* | (2006.01) |
| *F16B 12/00* | (2006.01) |
| *A47B 3/06* | (2006.01) |

(52) U.S. Cl.
CPC ........ *F16B 5/0012* (2013.01); *A47B 47/0075* (2013.01); *A47B 88/941* (2017.01); *F16B 12/00* (2013.01); *A47B 3/06* (2013.01); *A47B 2230/0077* (2013.01)

(58) Field of Classification Search
CPC .............. A47B 88/941; A47B 47/0075; A47B 2230/0077; A47B 2230/0074; F16B 5/0012; F16B 5/0016
See application file for complete search history.

(56) References Cited

U.S. PATENT DOCUMENTS

| | | |
|---|---|---|
| 919,257 A | 4/1909 | Seydewitz |
| 981,532 A | 1/1911 | Cary |
| 1,061,297 A | 5/1913 | Johnson |
| 1,419,647 A | 6/1922 | Shepherdson |
| 1,747,900 A | 2/1930 | Jenny |
| 1,903,631 A | 4/1933 | Morrison |
| 1,940,117 A | 12/1933 | Carpos |
| 2,240,256 A | 4/1941 | Elmendorf |
| 2,279,864 A | 4/1942 | Eide |

(Continued)

FOREIGN PATENT DOCUMENTS

| | | |
|---|---|---|
| DE | 102007058662 | 6/2009 |
| GB | 2353080 | 2/2001 |

(Continued)

OTHER PUBLICATIONS

Celery Rocking Chair viewed at http://www.eroomservice.com/manufacturer/celery/ circa Dec. 3, 2011.

(Continued)

*Primary Examiner* — Daniel J Rohrhoff
(74) *Attorney, Agent, or Firm* — Pate Peterson PLLC; Brett Peterson

(57) ABSTRACT

An article of modular furniture such as a drawer, case, cabinet, or table is provided. The article of furniture uses a first panel with a dovetail tab and a straight tab and a second panel with a dovetail slot and a straight slot. The first panel is flexed in order to insert the dovetail tab and the straight tab into the respective dovetail slot and straight slot and is then un-flexed to complete the assembly.

20 Claims, 22 Drawing Sheets

(56) References Cited

U.S. PATENT DOCUMENTS

| | | | |
|---|---|---|---|
| 2,334,912 A | 11/1943 | Eide | |
| 2,369,930 A | 2/1945 | Wagner | |
| D144,730 S | 5/1946 | Perrault | |
| 2,418,731 A | 4/1947 | Seitz | |
| 2,479,086 A | 8/1949 | Silverman | |
| 2,481,671 A | 9/1949 | John et al. | |
| 2,486,987 A | 11/1949 | Scarlett | |
| 2,518,955 A | 8/1950 | Stelzer | |
| 2,534,413 A | 12/1950 | Cenis | |
| 2,551,071 A | 5/1951 | Tyncs | |
| D164,552 S | 9/1951 | Curtis | |
| 2,595,002 A | 4/1952 | Schneider | |
| 2,602,012 A | 7/1952 | Doty | |
| 2,615,771 A | 10/1952 | Curtis | |
| 2,632,498 A | 3/1953 | Curtis | |
| 2,672,181 A | 3/1954 | Rose | |
| 2,677,491 A | 5/1954 | Burger | |
| 2,720,253 A | 10/1955 | Turner | |
| 2,745,591 A | 5/1956 | Holt | |
| 2,786,789 A | 3/1957 | Carlson | |
| 2,792,877 A | 5/1957 | West | |
| 2,825,101 A | 3/1958 | Rubsnstein | |
| 3,053,598 A | 9/1962 | Cheslow | |
| 3,149,880 A | 9/1964 | Steuer | |
| 3,186,027 A | 6/1965 | Merillat | |
| 3,262,405 A | 7/1966 | Sutton | |
| 3,300,245 A | 1/1967 | Rumble | |
| D212,601 S | 11/1968 | Rubsnstein | |
| 3,527,497 A | 9/1970 | Self | |
| 3,547,491 A | 12/1970 | Bovasso | |
| 3,578,385 A | 5/1971 | Stiglitz | |
| 3,603,656 A | 9/1971 | Ferman | |
| 3,697,363 A | 10/1972 | Martinez | |
| 3,788,700 A | 1/1974 | Wartes | |
| 3,812,977 A | 5/1974 | Glassman | |
| 3,847,435 A | 11/1974 | Skinner | |
| 4,055,924 A | 11/1977 | Beaver | |
| D247,596 S | 3/1978 | Osamu | |
| 4,082,356 A | 4/1978 | Johnson | |
| 4,103,818 A | 8/1978 | Raubenheimer | |
| 4,140,065 A | 2/1979 | Chacon | |
| 4,153,311 A | 5/1979 | Takhasaki | |
| 4,158,277 A | 6/1979 | Krempp et al. | |
| 4,188,067 A | 2/1980 | Elmer | |
| 4,191,113 A | 3/1980 | Hogberg | |
| 4,202,581 A | 5/1980 | Fleishman | |
| 4,225,180 A | 9/1980 | Gillis | |
| 4,258,464 A | 3/1981 | Ullman | |
| 4,348,052 A | 9/1982 | Roland | |
| 4,390,204 A | 6/1983 | Fleishman | |
| 4,419,028 A | 12/1983 | Roland | |
| 4,433,753 A | 2/1984 | Watson | |
| 4,433,843 A | 2/1984 | Bricco | |
| 4,492,332 A * | 1/1985 | Collins | B65D 5/48038 229/120.36 |
| 4,509,794 A | 4/1985 | Roland | |
| 4,533,174 A | 8/1985 | Fleishman | |
| 4,544,092 A | 10/1985 | Palmer | |
| 4,548,350 A | 10/1985 | Engle | |
| 4,574,917 A | 3/1986 | Stoddard | |
| 4,591,090 A | 5/1986 | Collins | |
| 4,593,950 A | 6/1986 | Vittorio | |
| 4,595,105 A | 6/1986 | Gold | |
| D289,234 S | 4/1987 | Hoult | |
| 4,685,609 A | 8/1987 | Ferrari | |
| 4,712,837 A | 12/1987 | Swilley | |
| 4,759,449 A | 7/1988 | Gold | |
| D299,087 S | 12/1988 | Bruce | |
| 4,841,878 A | 6/1989 | Kriegsman | |
| D302,216 S | 7/1989 | Roland | |
| 4,846,530 A | 7/1989 | Noble | |
| 4,867,327 A | 9/1989 | Roland | |
| 4,878,439 A | 11/1989 | Samson | |
| 4,926,759 A | 5/1990 | Vitsky et al. | |
| 5,011,228 A | 4/1991 | Marcantel | |
| 5,069,144 A | 12/1991 | Williford | |
| 5,082,329 A | 1/1992 | Mars | |
| 5,253,595 A | 10/1993 | Heidmann | |
| 5,263,766 A | 11/1993 | McCullough | |
| 5,275,467 A | 1/1994 | Kawecki | |
| 5,354,589 A | 10/1994 | Waas | |
| 5,367,964 A | 11/1994 | Hockensmith | |
| 5,387,027 A | 2/1995 | Maloney | |
| 5,454,331 A | 10/1995 | Green | |
| 5,605,378 A | 2/1997 | Oyediran | |
| 5,644,995 A | 7/1997 | Gurwell et al. | |
| 5,655,812 A | 8/1997 | Albecker | |
| 5,765,922 A | 6/1998 | Hsia | |
| 5,803,548 A | 9/1998 | Battle | |
| 5,921,631 A | 7/1999 | Bush | |
| 5,927,816 A | 7/1999 | Hsu | |
| 5,941,377 A | 8/1999 | Hart | |
| 5,992,938 A | 11/1999 | Jones | |
| 6,036,270 A | 3/2000 | Bufalini | |
| 6,041,920 A | 3/2000 | Hart | |
| D422,799 S | 4/2000 | Dworshak et al. | |
| 6,053,585 A | 4/2000 | Osen | |
| 6,109,695 A | 8/2000 | Kahwaji | |
| 6,126,022 A | 10/2000 | Merkel | |
| 6,155,641 A | 12/2000 | Frost | |
| 6,174,116 B1 | 1/2001 | Brand | |
| 6,189,974 B1 | 2/2001 | Beck | |
| 6,247,754 B1 | 6/2001 | Vanderaue et al. | |
| 6,283,564 B1 | 9/2001 | Corson | |
| 6,347,772 B1 | 2/2002 | L'Hotel | |
| 6,378,707 B1 | 4/2002 | Taggert | |
| 6,443,076 B1 | 9/2002 | Case | |
| 6,532,878 B2 | 3/2003 | Tidemann | |
| 6,595,378 B2 | 7/2003 | Wang | |
| 6,615,746 B2 | 9/2003 | Bart | |
| 6,615,999 B1 | 9/2003 | Culp | |
| 6,619,749 B2 | 9/2003 | Willy | |
| 6,675,979 B2 | 1/2004 | Taylor | |
| 6,769,369 B1 | 8/2004 | Brandenberg | |
| 6,807,912 B2 | 10/2004 | Willy | |
| D499,577 S | 12/2004 | Willy | |
| 6,845,871 B1 | 1/2005 | Culp | |
| 6,848,747 B1 | 2/2005 | Robinson | |
| 6,955,401 B1 | 10/2005 | Shoulberg | |
| 7,066,548 B2 | 6/2006 | Butler | |
| 7,114,300 B1 | 10/2006 | Culp | |
| 7,168,766 B2 | 1/2007 | Pelletier | |
| 7,219,962 B2 | 5/2007 | Stone | |
| D547,076 S | 7/2007 | Hughes et al. | |
| 7,255,403 B2 | 8/2007 | Butler | |
| 7,300,110 B1 | 11/2007 | Debien | |
| 7,533,940 B1 | 5/2009 | Zook | |
| 7,631,605 B2 | 12/2009 | Willy | |
| 7,856,772 B1 | 12/2010 | Culp et al. | |
| 8,167,377 B2 | 5/2012 | Kovach | |
| 8,220,399 B2 | 7/2012 | Berent et al. | |
| 8,332,917 B2 | 12/2012 | Forster et al. | |
| 8,590,976 B2 | 11/2013 | Davis | |
| 9,534,623 B2 | 1/2017 | Anderson et al. | |
| 9,615,663 B2 | 4/2017 | Davis | |
| 2003/0107255 A1 | 6/2003 | Willy | |
| 2004/0056526 A1 | 3/2004 | Willy | |
| 2008/0074013 A1 | 3/2008 | Ahlgrim et al. | |
| 2009/0066140 A1* | 3/2009 | Berent | A47B 3/06 297/440.13 |
| 2010/0003077 A1 | 1/2010 | Kelley | |
| 2012/0080910 A1* | 4/2012 | Davis | A47B 47/0075 297/118 |
| 2013/0062294 A1 | 3/2013 | Beaty | |
| 2013/0080286 A1 | 3/2013 | Rotholz | |
| 2013/0170904 A1* | 7/2013 | Cappelle | A47B 47/042 403/381 |
| 2014/0263130 A1 | 9/2014 | Davis | |
| 2017/0023043 A1 | 1/2017 | Koelling et al. | |
| 2017/0079426 A1 | 3/2017 | Davis | |
| 2018/0112696 A1* | 4/2018 | Davis | A47B 47/042 |
| 2019/0059594 A1* | 2/2019 | Davis | A47C 4/021 |

(56) References Cited

U.S. PATENT DOCUMENTS

FOREIGN PATENT DOCUMENTS

| NL | 1025719 | 9/2005 |
| WO | WO 2005-085656 | 9/2005 |

OTHER PUBLICATIONS

PlyGrid Shelves viewed at http://offi.com/products/offikids/PLYGRID.php?p2c=249 circa Dec. 3, 2011.
Snap Table viewed at http://www.offi.com/pdfs/snaptable.pdf circa Dec. 3, 2011.
Furniture viewed at http://www.playatech.com/product_list.php circa Dec. 3, 2011.
Arabic Table viewed at http://www.plydea.com/support/assemblypdf.html circa Dec. 3, 2011.
Blue7Chair viewed at http://www.plydea.com/support/assemblypdf.html circa Dec. 3, 2011.
First Desk viewed at http://www.plydea.com/support/assemblypdf.html circa Dec. 3, 2011.
Rinaldo Chair viewed at http://www.plydea.com/support/assemblypdf.html circa Dec. 3, 2011.
Tuffet Stool viewed at http://www.plydea.com/support/assemblypdf.html circa Dec. 3, 2011.
WasteNot Basket viewed at http://www.plydea.com/support/assemblypdf.html circa Dec. 3, 2011.
Winehold Wine Rack viewed at http://www.plydea.com/support/assemblypdf.html circa Dec. 3, 2011.

\* cited by examiner

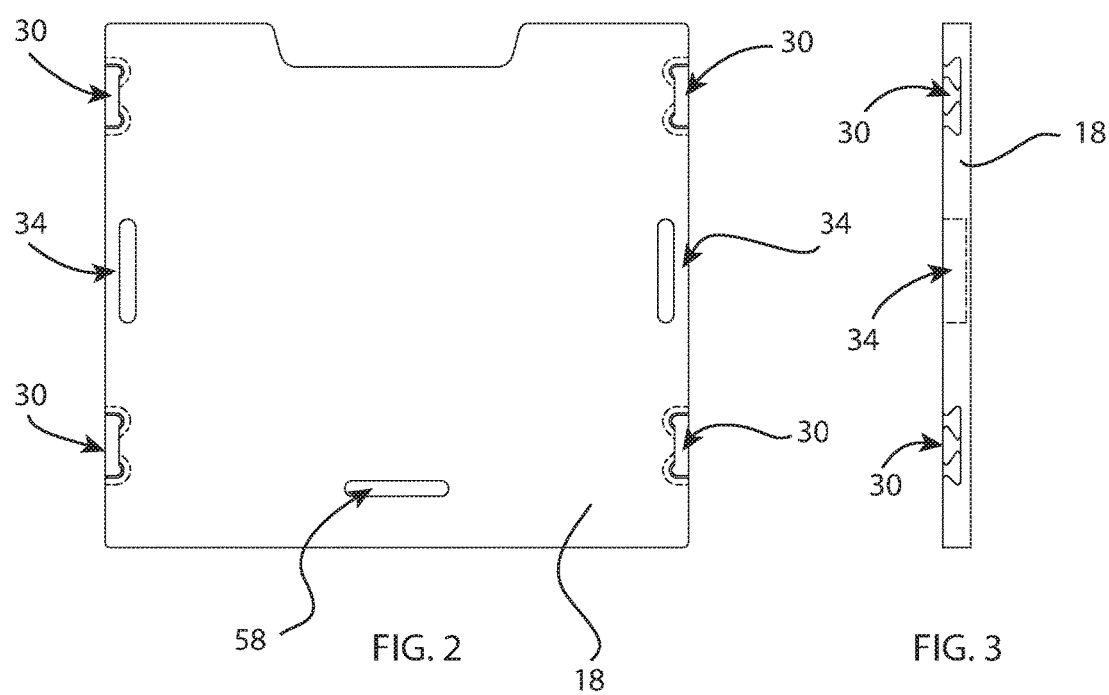

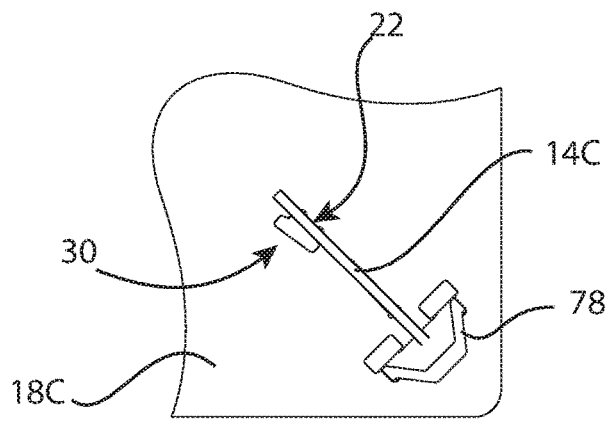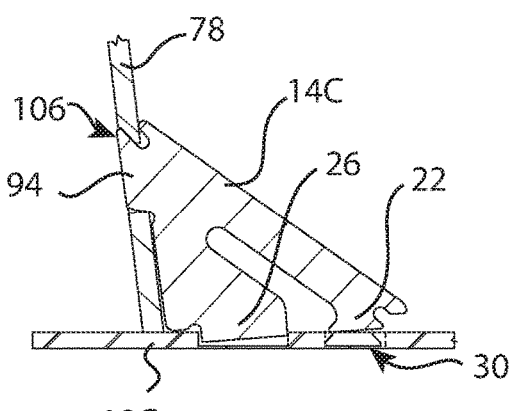
FIG. 22A  FIG. 22B
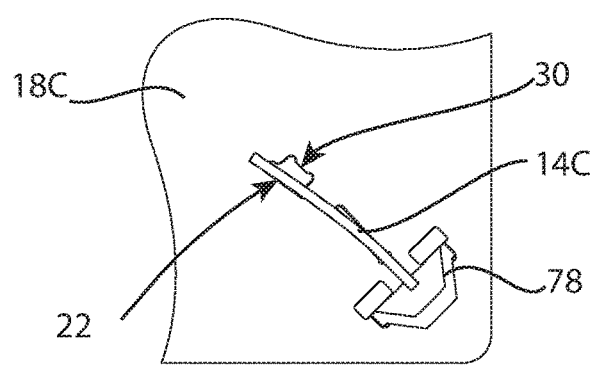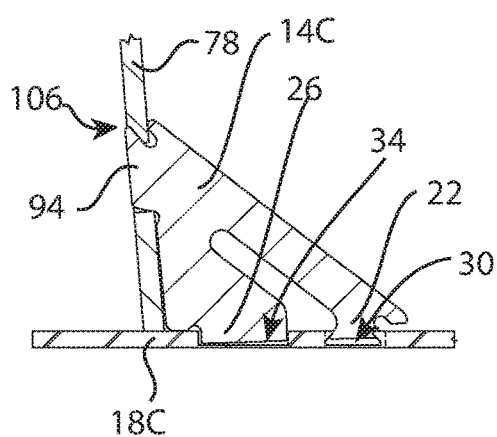
FIG. 23A  FIG. 23B
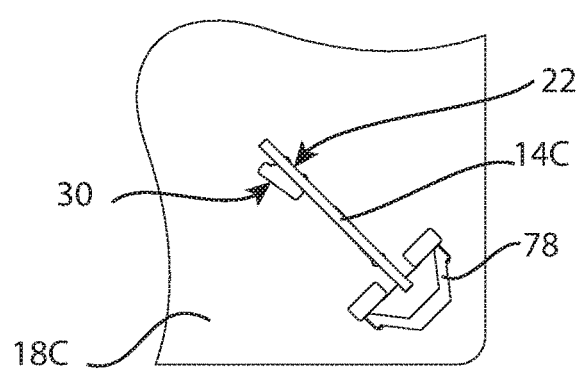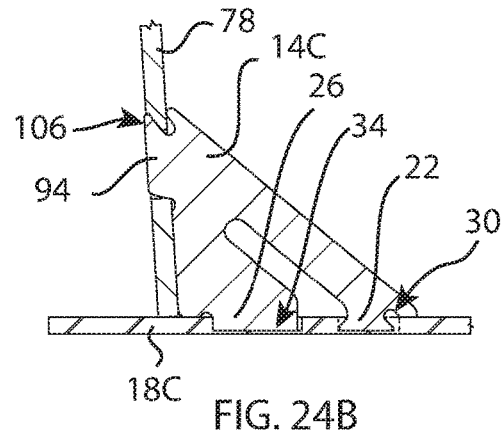
FIG. 24A  FIG. 24B

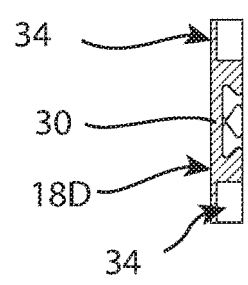 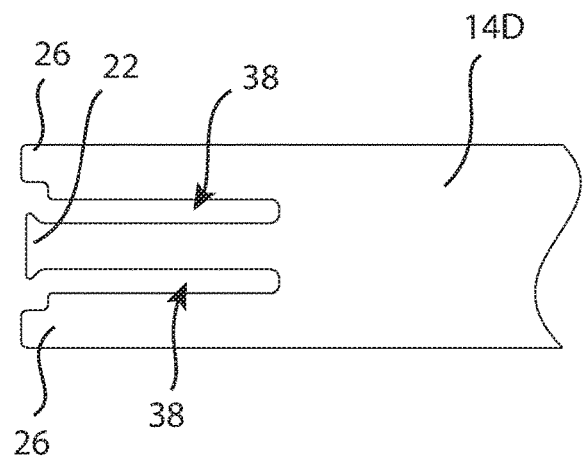
FIG. 26A          FIG. 26B
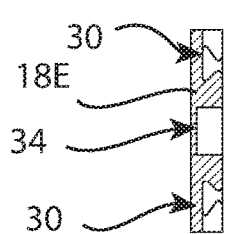 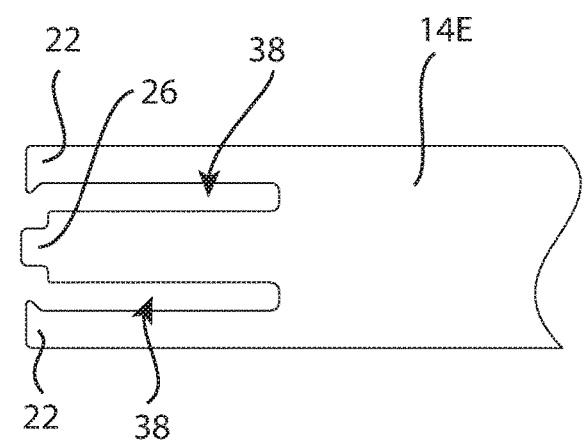
FIG. 27A          FIG. 27B

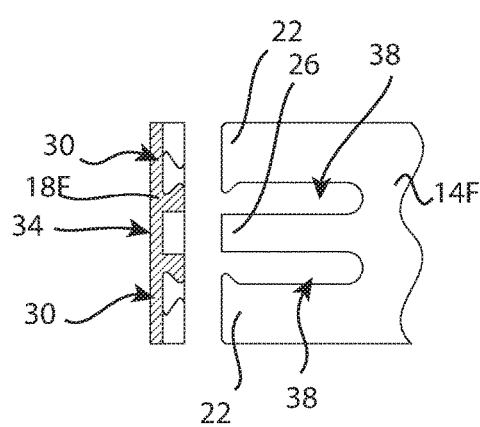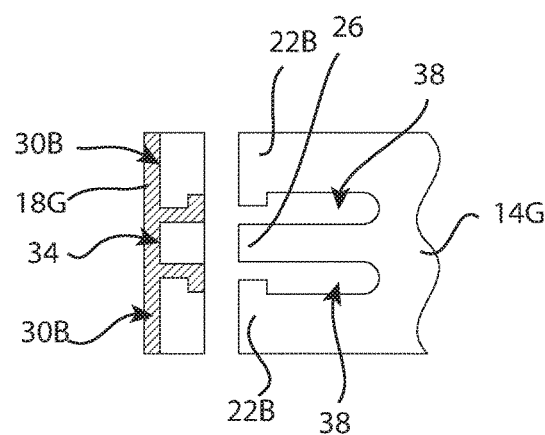
FIG. 28A  FIG. 28B      FIG. 29A  FIG. 29B
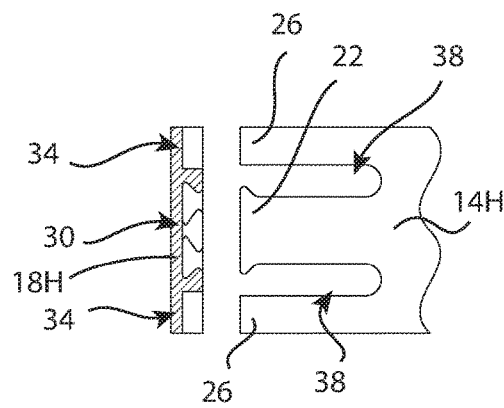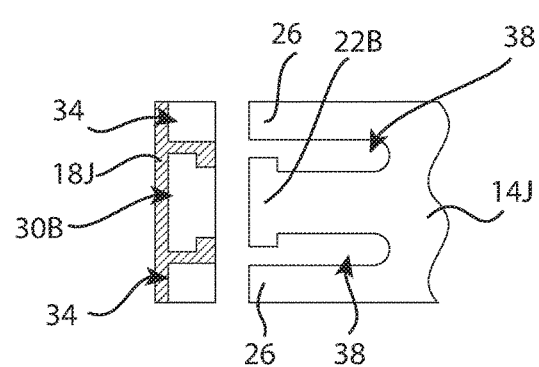
FIG. 30A  FIG. 30B      FIG. 31A  FIG. 31B
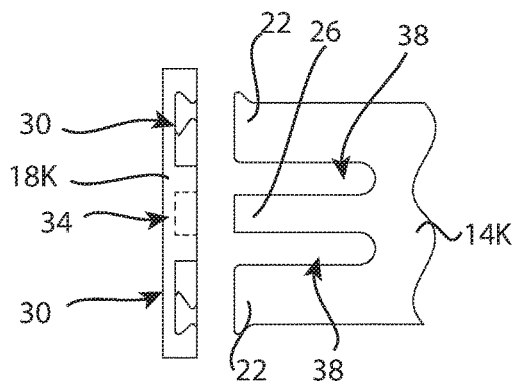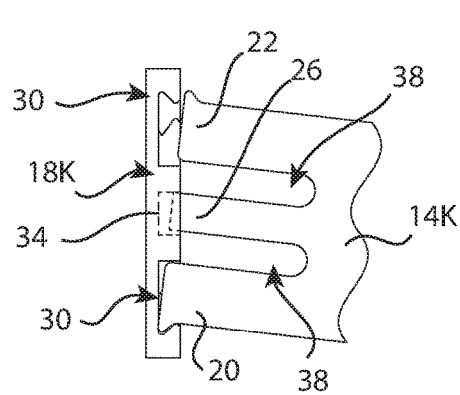
FIG. 32A  FIG. 32B      FIG. 33A  FIG. 33B

US 10,415,612 B2

1

MODULAR FURNITURE WITH STRESSED PANEL DOVETAIL JOINT

RELATED APPLICATIONS

The present application claims the benefit of U.S. Provisional Application Ser. No. 62/539,654, filed Aug. 1, 2017, which is hereby incorporated by reference in its entirety.

THE FIELD OF THE INVENTION

The present invention relates to furniture. In particular, examples of the present invention relate to a modular furniture joint which allows tool-less assembly and increased stability between two furniture panels.

BACKGROUND

Many persons desire modular furniture. Modular furniture is often assembled by the end user from flat pieces and is thus easy to store and transport in the un-assembled form. Modular furniture is often less expensive than other styles of furniture. Modular furniture often suffers from instability, however. In some instances, modular furniture is made overly complex or uses more permanent fastening or construction methods to stabilize the furniture. This, however, makes the furniture more cumbersome for the end user and reduces some of the portability and ease of use associated with this type of furniture. Additionally, the use of fasteners such as screws or nails to stabilize the furniture is often problematic in the long term as these fasteners become loose with use and movement of the furniture.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

FIG. 2 shows a back view of the front panel of the drawer.

FIG. 3 shows a side view of the front panel of the drawer.

2

Figure 16:
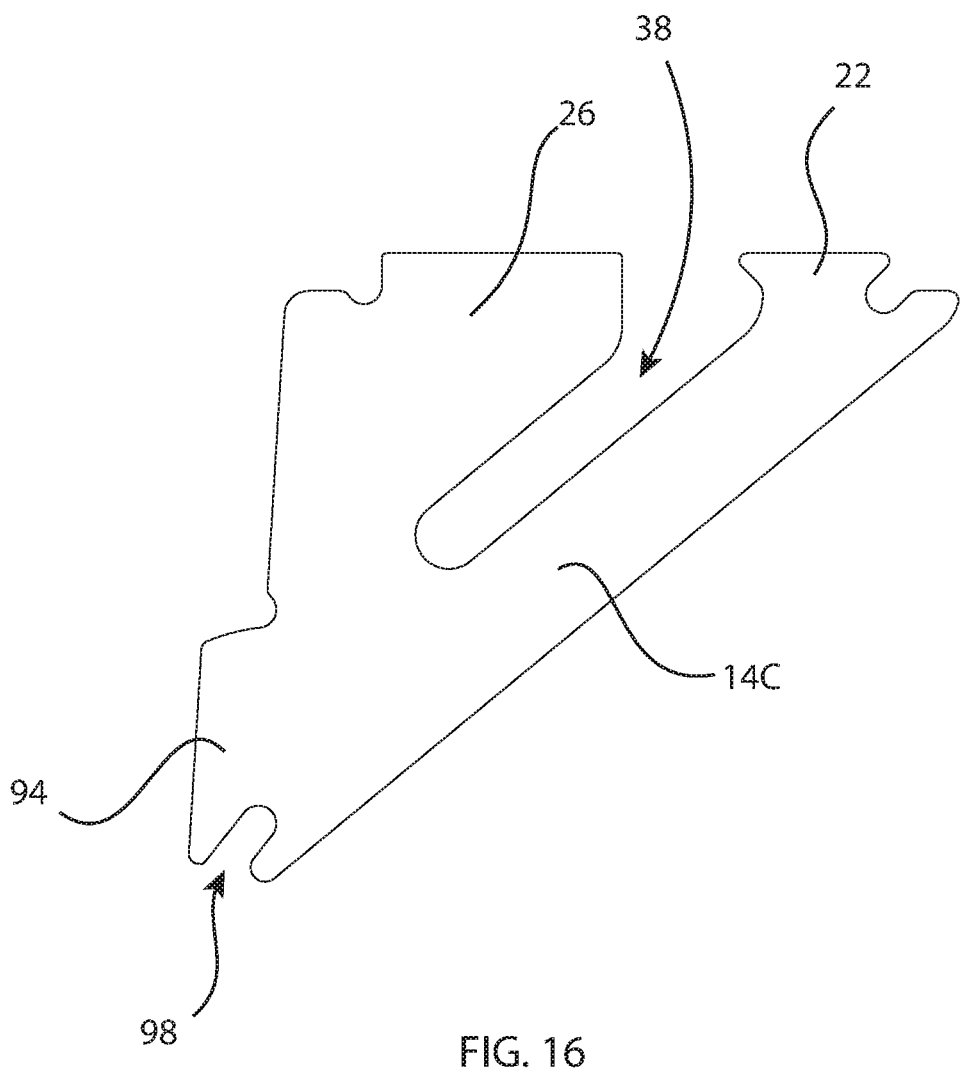
Figure 17A:
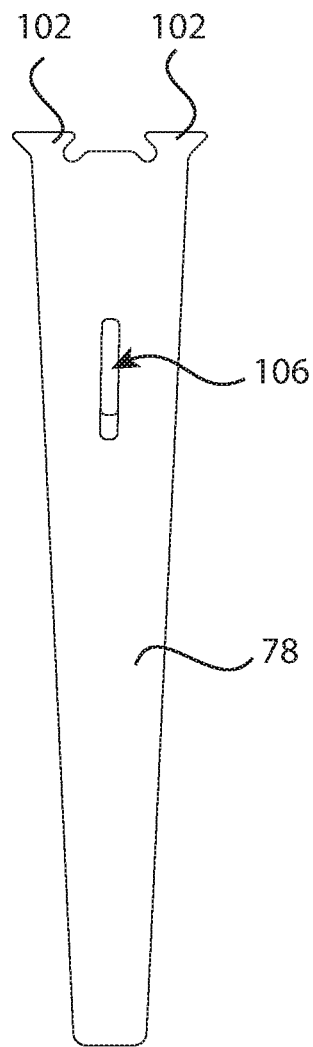
Figure 17B:
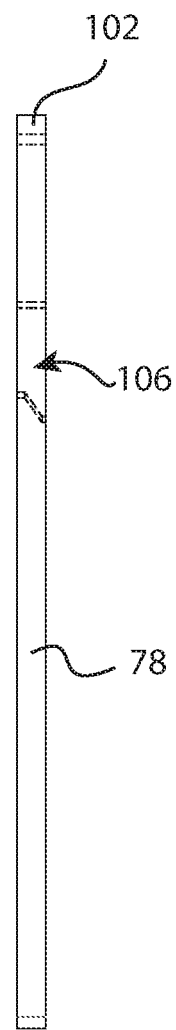
Figures 18A, 18B, 18C:
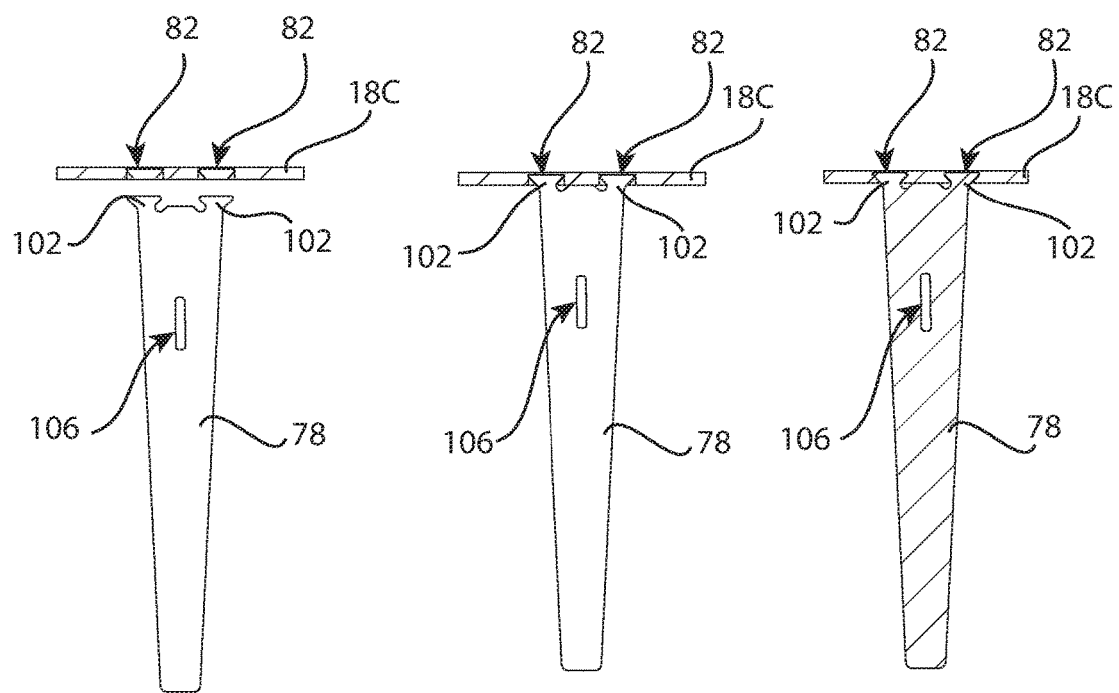
Figure 19A:
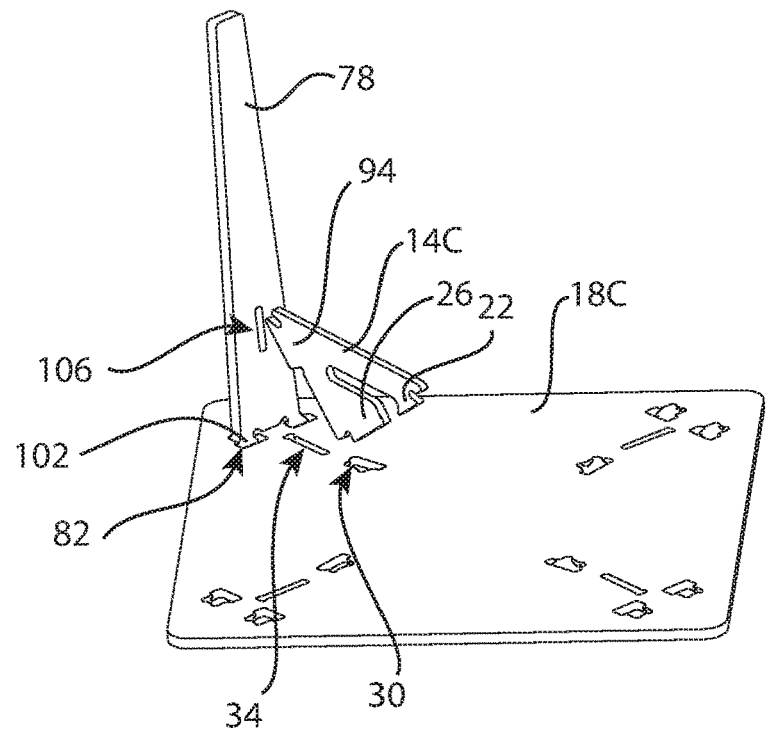
Figure 19B:
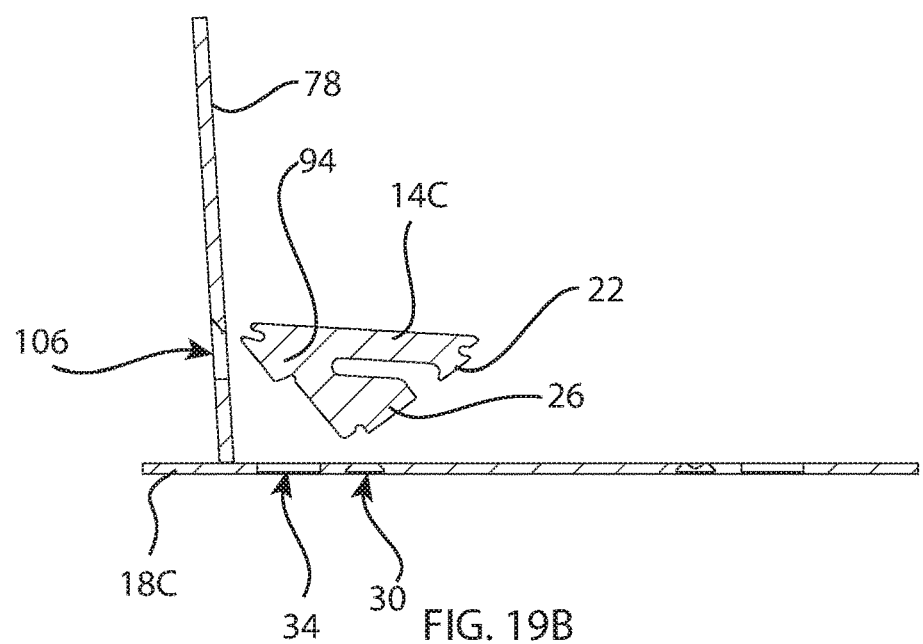
Figure 20A:
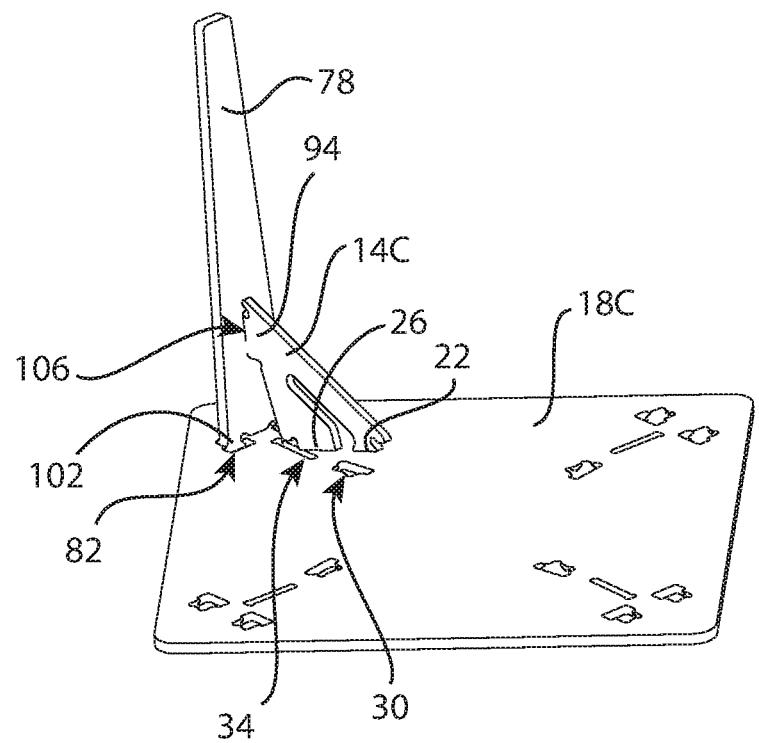
Figure 20B:
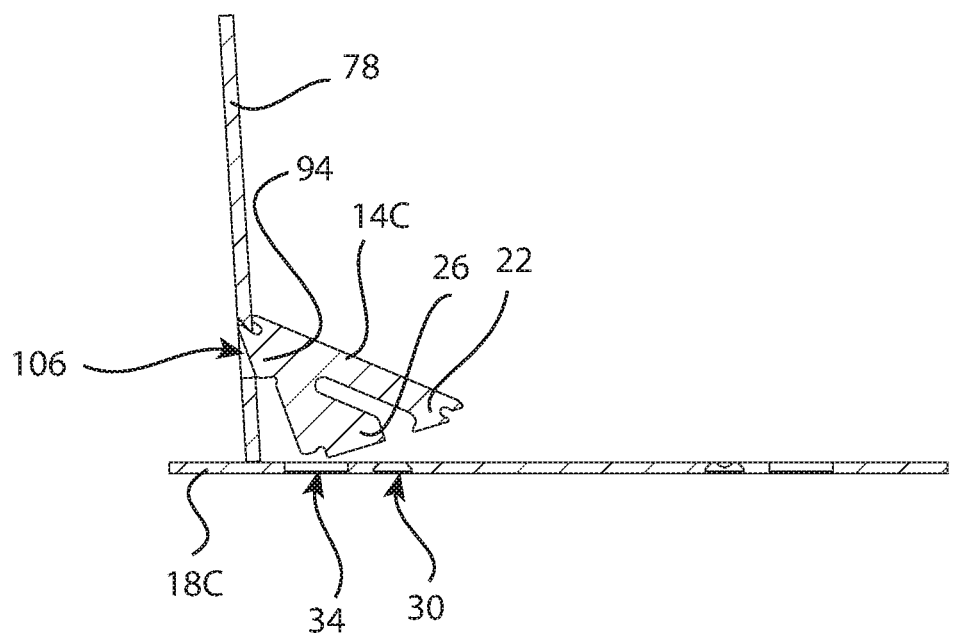
Figure 21:
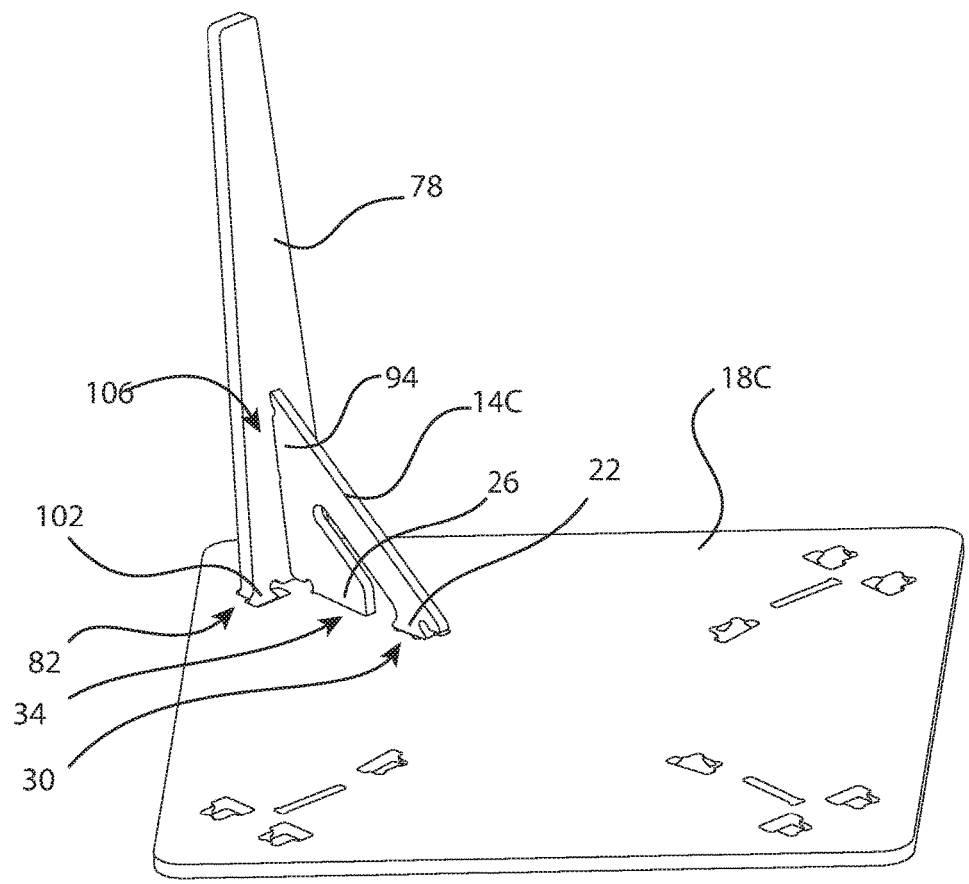
Figure 25:
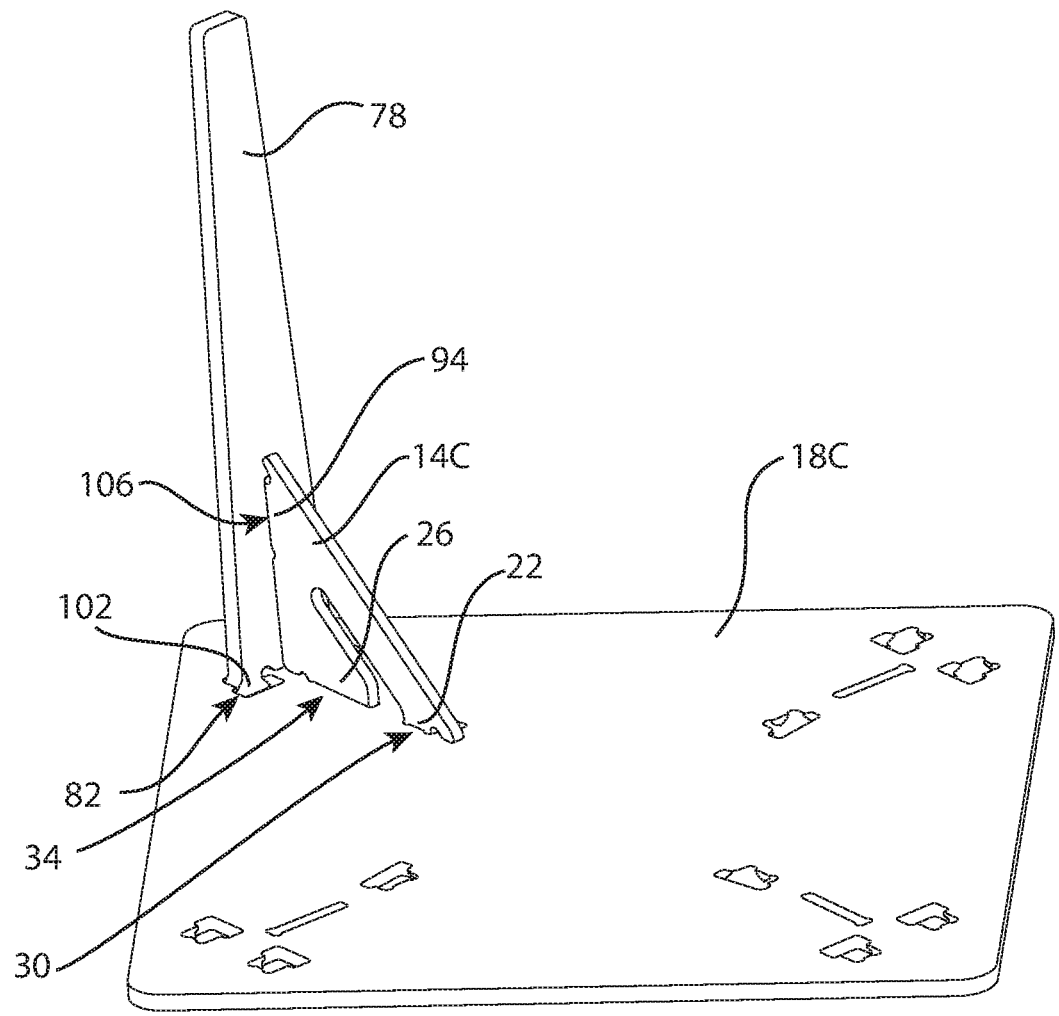

FIG. 16 shows a side view of the leg brace of the table.
FIG. 17A shows a front view of the table leg.
FIG. 17B shows a side view of the table leg.
FIG. 18A shows a front view of assembly of the table leg.
FIG. 18B shows another front view of assembly of the table leg.
FIG. 18C shows another front view of assembly of the table leg.
FIG. 19A shows a perspective view of assembly of the table leg.
FIG. 19B shows a cross sectional view of the assembly step of FIG. 19A.
FIG. 20A shows a perspective view of assembly of the table leg.
FIG. 20B shows a cross sectional view of the assembly step of FIG. 20A.
FIG. 21 shows a perspective view of a partially assembled table.
FIG. 22A shows a partial bottom view of a table.
FIG. 22B shows a partial bottom view of a table.
FIG. 23A shows a partial bottom view of a table.
FIG. 23B shows a partial bottom view of a table.
FIG. 24A shows a partial bottom view of a table.
FIG. 24B shows a partial bottom view of a table.
FIG. 25 shows a perspective view of a partially assembled table.
FIG. 26A shows a cross-sectional view of a design variation of the furniture joint.
FIG. 26B shows a partial side view of the design variation of the furniture joint.
FIG. 27A shows a cross-sectional view of a design variation of the furniture joint.
FIG. 27B shows a partial side view of the design variation of the furniture joint.
FIG. 28A shows a cross-sectional view of a design variation of the furniture joint.
FIG. 28B shows a partial side view of the design variation of the furniture joint.
FIG. 29A shows a cross-sectional view of a design variation of the furniture joint.
FIG. 29B shows a partial side view of the design variation of the furniture joint.
FIG. 30A shows a cross-sectional view of a design variation of the furniture joint.
FIG. 30B shows a partial side view of the design variation of the furniture joint.
FIG. 31A shows a cross-sectional view of a design variation of the furniture joint.
FIG. 31B shows a partial side view of the design variation of the furniture joint.
FIG. 32A shows a cross-sectional view of a design variation of the furniture joint.
FIG. 32B shows a partial side view of the design variation of the furniture joint.
FIG. 33A shows a cross-sectional view of a design variation of the furniture joint.
FIG. 33B shows a partial side view of the design variation of the furniture joint.

Corresponding reference characters indicate corresponding components throughout the several views of the drawings. Skilled artisans will appreciate that elements in the figures are illustrated for simplicity and clarity and that not all pieces of an item of furniture are shown in each figure to more clearly show aspects of the furniture joint and item of furniture. The figures have been drawn to scale to assist in illustrating the invention. Also, common but well-understood elements that are useful or ornamental in a commercial embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art and that the drawings are not necessarily drawn to scale.

The figures herein illustrate an improved furniture joint that may be used in creating various items of furniture. As examples, a drawer, a cabinet, and a table which each utilize the furniture joint are shown. The furniture joint provides several advantages. The furniture joint may be easily constructed using flat sheets of plywood, plastic, or other materials which are desirable in creating a piece of furniture. Plywood sheets, for example, are available with prefinished surfaces and provide weight, strength, and durability which are desirable in furniture. The panels used to create the furniture joint and the associated piece of furniture may be easily cut from a large sheet of material on a CNC router table, allowing for inexpensive and automated cutting of the various panels of the piece of furniture. The furniture joint may be constructed without fasteners. Accordingly, the furniture joint avoids the failure modes of fasteners such as screws which frequently become loose in their associated panels and allow the furniture to become loose over time. The furniture joint also does not require glue for assembly or strength. This allows the piece of furniture to be disassembled for later storage or transportation. The furniture joint may be designed so that a panel remains stressed after assembly, providing a higher degree of stiffness in the joint and increasing the stability of the piece of furniture. The furniture joint retains its strength and stiffness even after some wear of the furniture panels and retains strength even if there are variations in thickness in the material sheets used to cut the furniture panels.

FIGS. 1 through 7 illustrate how a drawer can be constructed using the furniture joint. The furniture joint may be used between the drawer front and the drawer side to create an approximately perpendicular joint at a corner with no overhanging or extending elements. Such a joint allows the drawer to slide into a recess in a cabinet without requiring excessive clearance around the drawer. The joint also provides a secure connection at the drawer face that is not loosened or disassembled by movement of a panel as may occur in other tab and slot joint designs.

Figure 1:
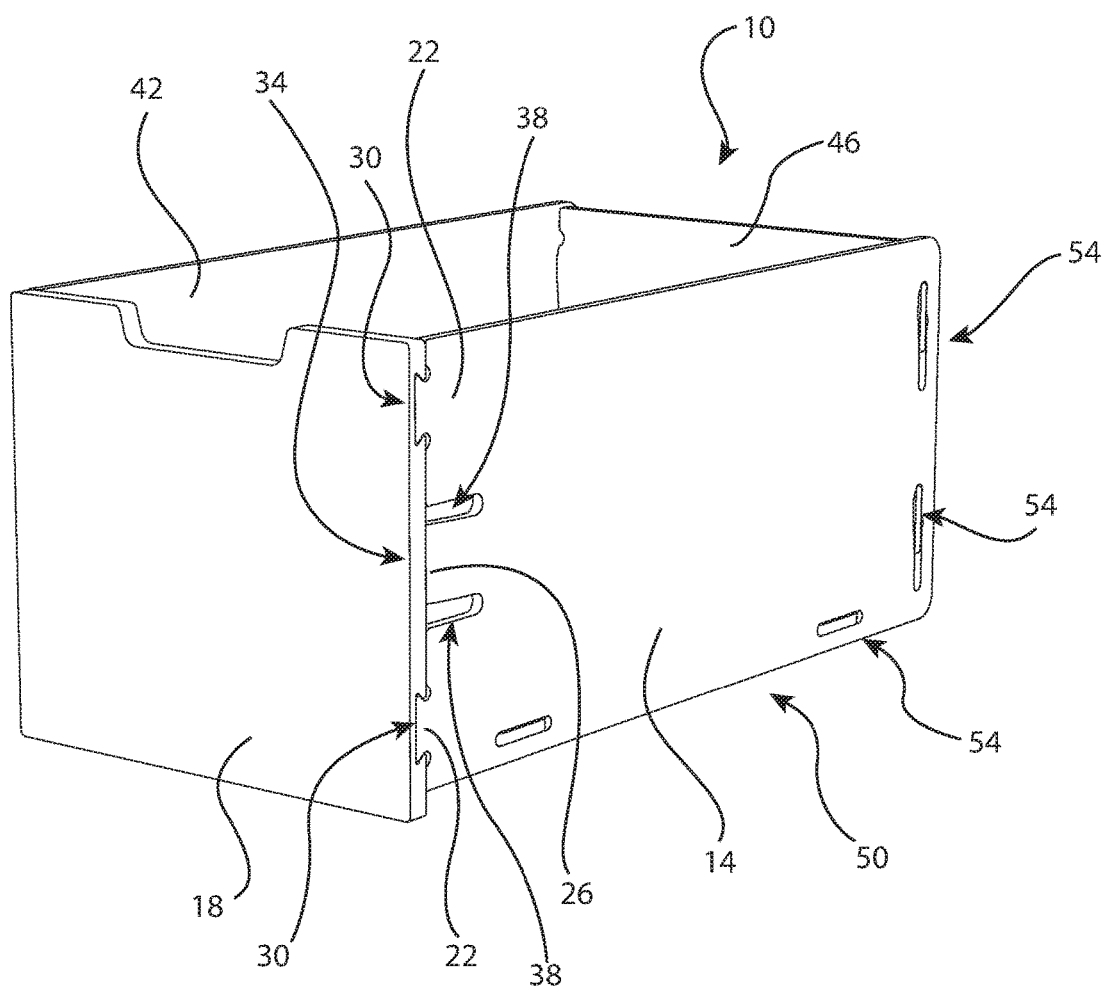
FIG. 1 shows a perspective drawing of a drawer with a furniture joint according to the present invention.

FIG. 1 shows a perspective front view of a drawer 10 which uses the furniture joint to join a first panel 14 (the side panels 14) with a second panel 18 (the front panel 18) of the drawer 10. Generally, the furniture joint is used to join a first panel 14 with a second panel 18. These panels 14, 18 are often flat panels made from a material which will deform elastically such as plywood. The panels 14, 18 need not have the same thickness. Often, a different thickness will provide desirable joint performance. For example, the first panel 14 may be made from 0.25 inch plywood to provide a desired bending strength while the second panel 18 may be made from 0.5 inch plywood to provide for greater slot depth.

The side panel 14 includes first and second dovetail tabs 22 and a straight tab 26. The front panel 18 includes first and second dovetail slots 30 and a straight slot 34 which correspond to the dovetail tabs 22 and straight tab 26. The straight slot 34 may be formed as a blind slot and may not be visible from the front side of the front panel 18. The top and bottom dovetail tabs 22 on the side panel 14 of the drawer 10 fit into dovetail slots 30 cut inwardly into the sides of the drawer front 18. A flexed tab 26 located between the two dovetail tabs 22 on the drawer side panel 14 is inserted into a blind slot 34 formed on the back of the drawer front panel 18. The flexed tab 26 is formed by cuts 38 that extend rearwardly into the drawer side panel 14 for a distance; separating the flexed tab 26 from the dovetail tabs 22 and allowing the flexed tab 26 to flex and bend out of the plane of the drawer side panel 14. The cuts/slots 38 extend into the panel 14 to a distance which is approximately 5 times the length of the tab 22 or tab 26. According to the desired stiffness in the resulting joint, the slot 38 may extend into the panel 14 a distance which is between approximately 3 to 15 times the length of the tabs 22, 26, or between approximately 5 to 10 times the length of the tabs 22, 26.

The drawer 10 is assembled by bending the flexed tab 26 inwardly towards the center of the drawer front panel 18 and inserting the end of the flexed tab 26 into the blind slot 34 in the back of the drawer front panel 18 with the two dovetail tabs 22 positioned to the side of the drawer front panel 18 adjacent the openings of the dovetail slots 30. The flexed tab 26 is then allowed to unbend while the dovetail tabs 26 slide into the dovetail slots 30. The flexed tab 26 (and to some degree the side panel 14) may remain somewhat bent once the joint between the side panel 14 and the front panel 18 is in a fully assembled configuration; biasing the dovetail tabs 26 into the dovetail slots 30 and applying a small amount of pressure to the assembled joint. This keeps the joint stiff and reduces play in the assembled drawer 10. The drawer 10 includes a second (rear) side panel 14 which is attached to the front panel 18 in the same manner as the front side panel 14. The drawer 10 also includes a back panel 46 and a bottom panel 50 which are attached to the side panels 14 using tab and slot joints as indicated at 54.

FIGS. 2 and 3 show a back and side view of the front panel 18 of the drawer, respectively. The dovetail slots 30 are cut into the side edges of the front panel 18 and are open to the side edges so that a dovetail tab 22 can be inserted sideways into the slot 30 and cannot be pulled transversely out of the slot (in a direction out of the page). The straight slots 34 are cut into the back face of the front panel 18 and are located inwardly from the edge of the panel 18 so that the slots 34 are not open to the edge of the front panel 18. This requires flexing of the straight tab 26 in order to assemble or disassemble the joint. The straight slot 34 may be cut deeper than necessary to provide clearance with the end of the straight tab 26. Both the dovetail slots 30 and the straight slot 34 may be blind slots that do not penetrate the front of the panel 18 for cosmetic reasons. As shown, the dovetail slots 30 are typically overcut at the corners to allow a straight cut dovetail tab 22 to enter the slot 30. The inner edge of the dovetail slots 30 may be cut straight to provide a broader face for contact with the face of the dovetail tab 22. The lower center slot 58 may accept a tab in the drawer bottom panel 50.

FIG. 3 illustrates how the dovetail slot 30 has a dovetail shape when viewed from the end of the slot (i.e. the edge of the panel 18) so that a dovetail tab 22 is inserted into the slot in a direction along the plane of the panel 18 and, once fully assembled, cannot pull out of the dovetail slot in a direction transverse to the plane of the panel 18.

Figure 4:
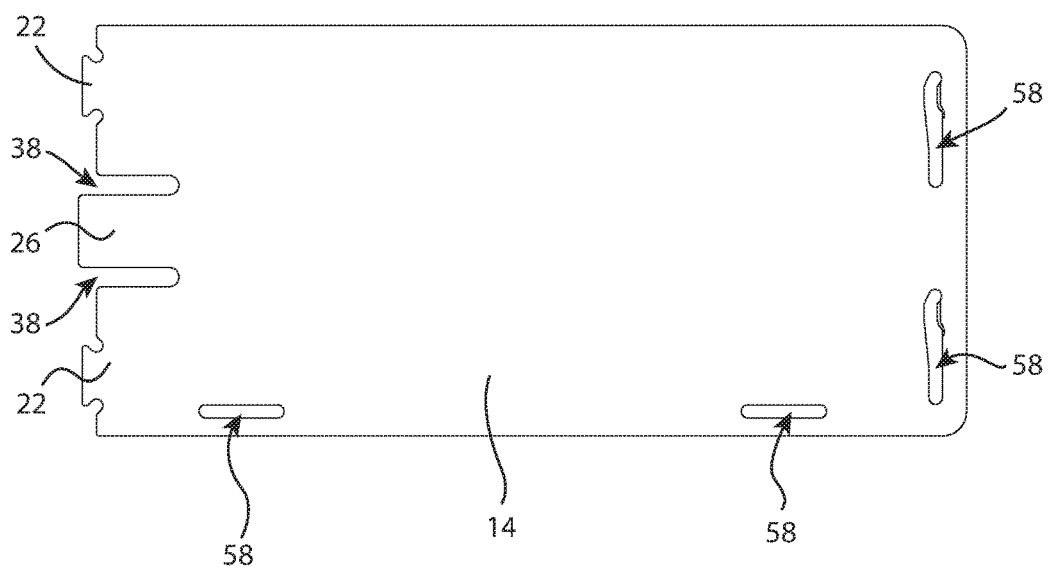
FIG. 4 shows a side view of the side panel of the drawer.

FIG. 4 shows a side view of the side panel 14 of the drawer, with the two types of tabs. The dovetail tabs 22 and the straight (flexed) tab 26 formed on the front (left side) of the drawer side panel 14 engage the slots 30, 34 formed on the drawer front panel 18 as described above. Slots 38 are formed between the dovetail tabs 22 and the straight tab 26. The slots 38 typically extend through the side panel 14 completely. The length of the slots 38 determines the flexibility of the panel 14 in bending the straight tab 26 out of plane relative to the dovetail tabs 22 and determines the resulting stiffness of the joint. Longer slots 38 make the straight tab 26 more flexible and make the joint easier to assemble although less stiff once assembled. If the slots 38 are too short, the tab 26 may not be sufficiently flexible to allow assembly of the joint. The relative sizes of the dovetail slots 22 and the slot 26 may be adjusted to ease assembly of the first panel 14 and second panel 18. Making the slot 26 longer or shorter may allow for easier insertion of the tab 26 before the dovetail tabs 22 or vice versa. The drawer side panel 14 is also shown with slots 58 to receive tabs on the drawer bottom panel 50 and drawer back panel 46 to form the completed drawer. FIG. 4 illustrates how the dovetail tab is formed with a dovetail shape when viewed in a direction transverse to the plane of the panel 14 so that the panel 14 is assembled in a perpendicular orientation to the panel 18. The panel 14 may be cut with a straight router bit and is easy to produce.

Figure 5:
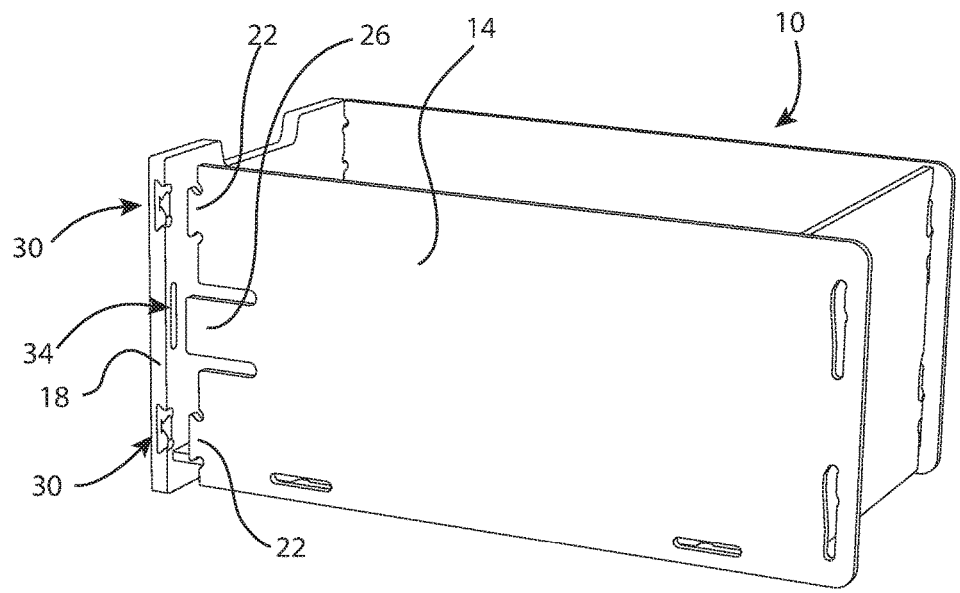
FIG. 5 shows a partially disassembled perspective view of the drawer.

FIG. 5 shows a partially assembled drawer 10, with the last side panel 14 about to be assembled. The figure particularly illustrates the positioning of the dovetail tabs 22 and slots 30 and the flexed tab 26 and blind slot 34. For assembly, the dovetail tabs are moved adjacent to the side of the drawer front panel 18 while the flexed tab 26 is bent inwardly towards the center of the drawer front panel 18 in alignment with the straight slot 34 to allow the flexed tab 26 to be inserted into the blind slot 34. Insertion of the tab 26 into the slot 34 aligns the dovetail tabs 22 depth-wise with the dovetail slots and allows the dovetail tabs 22 to move into the dovetail slots 30. This removes some of the bending from the bent tab 26. The slot 34 may be positioned inwardly towards the center of the front panel 18 relative to the dovetail slots 30 so that, in the assembled joint, the straight tab 26 is held out of the plane of the side panel 14 and is displaced inwardly towards the center of the front panel 18 with respect to the dovetail tabs 22. This creates some tension in the assembled joint and presses the dovetail tabs 22 against the inner edges of the dovetail slots 30; stiffening the joint and removing slop from the assembled piece of furniture.

Figure 6:
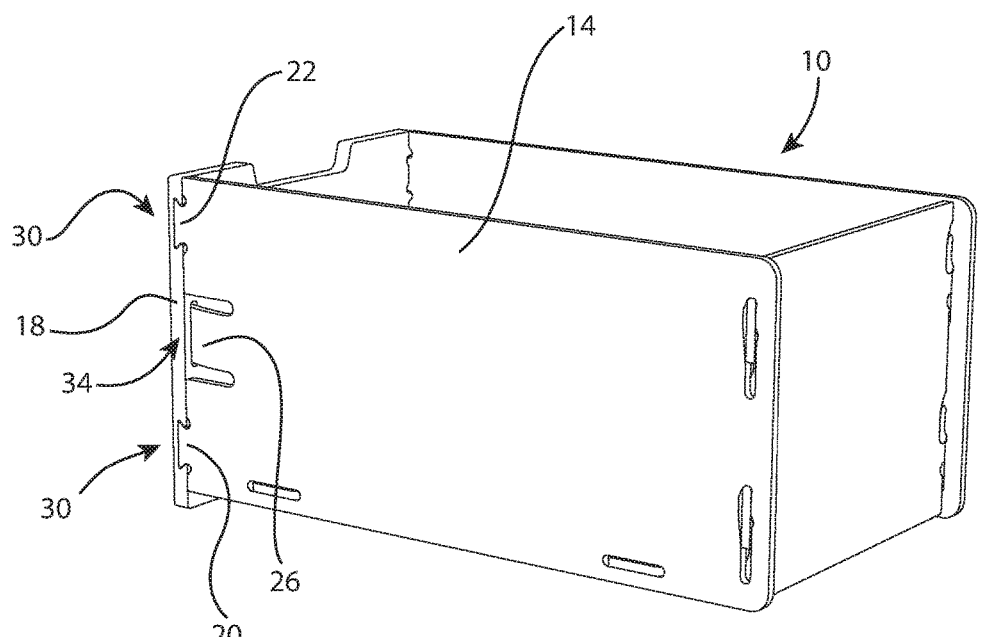
FIG. 6 shows an assembled perspective view of the drawer.

FIG. 6 shows an assembled drawer 10. After bending the side panel 14 and flexed tab 26 and placing the flexed tab 26 into the blind slot 34, the side panel 14 may be at least partially unbent to allow the dovetail tabs 22 to move sideways into the dovetail slots 30. The joint is held securely in the assembled position because the tab 26 must be bent with respect to the side panel 14 in order to disassemble the joint between the side panel 14 and the drawer front panel 18. The drawer is thus held in an assembled configuration without requiring additional fasteners such as screws.

Figure 7:
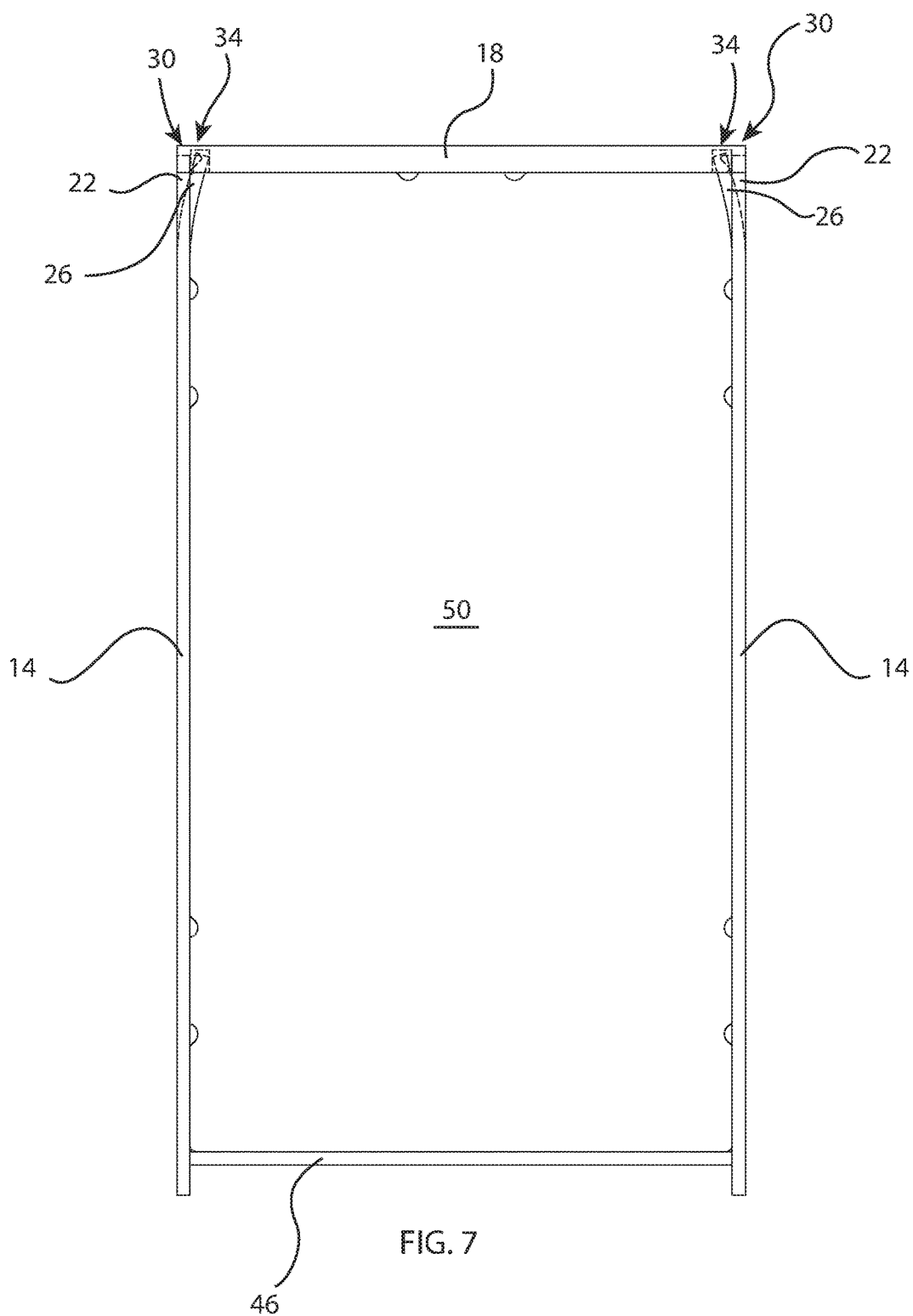
FIG. 7 shows a top view of the assembled drawer.

FIG. 7 shows a top view of an assembled drawer 10. This illustrates how the flexed tab 26 may remain somewhat bent when the joint between the side panel 14 and the front panel 18 is in an assembled configuration to apply some pressure between the dovetail tabs 22 and the dovetail slots 30; stiffening the assembled drawer. The amount of residual bending of the straight tab 26 in the assembled joint is exaggerated in the figure to allow for understanding of the assembled joint. The first panel 14 may be constructed with plywood which is between about ⅛ inch and about ½ inch, and may often be approximately ¼ inch thick. In the assembled joint, the tab 26 may typically remain bent (displaced relative to the dovetail tabs 22) between about 0.005 inches and about ¼ inch, and often between about 1/16 inch and ⅛ inch.

The drawer 10 is assembled by placing the front tab of the bottom panel 50 into the center-bottom slot 58 on the front panel 18. The tabs 22, 26 on the left panel 14 are inserted into the left slots 30, 34 on the front panel 18; approaching the front panel 18 at an angle of approximately 15 degrees open from the bottom panel 50. The tabs 22, 26 can be placed into the respective slots 30, 34 by flexing the tab 26 inward and the dovetail tabs 22 outward; allowing all three tabs 22, 26 to enter their appropriate slot 30, 34. All of the tabs 22, 26 are then allowed to relax and seat into the slot 30, 34. The left panel 14 is then rotated inward towards the bottom panel 50 until the two left-facing tabs on the bottom panel 50 enter their respective slots on the left side panel 14. The left panel 14 is now approximately perpendicular to the front panel 18.

Steps 2 and 3 are repeated with the right panel 14 for the right slots 30, 34 on the front panel 18. The left and right panels are rotated outward at the back slightly, allowing the back panel 46 to be assembled by placing the tabs on the left and right of the back panel into their respective slots on the left and right panels 14. The left and right panels 14 are rotated back inward until they are approximately perpendicular to the front panel 18. The back panel 46 is slid upward, securing the back panel 46 to the side panels 14 via constraining geometry in the tab and slot joints 54.

Figure 8:
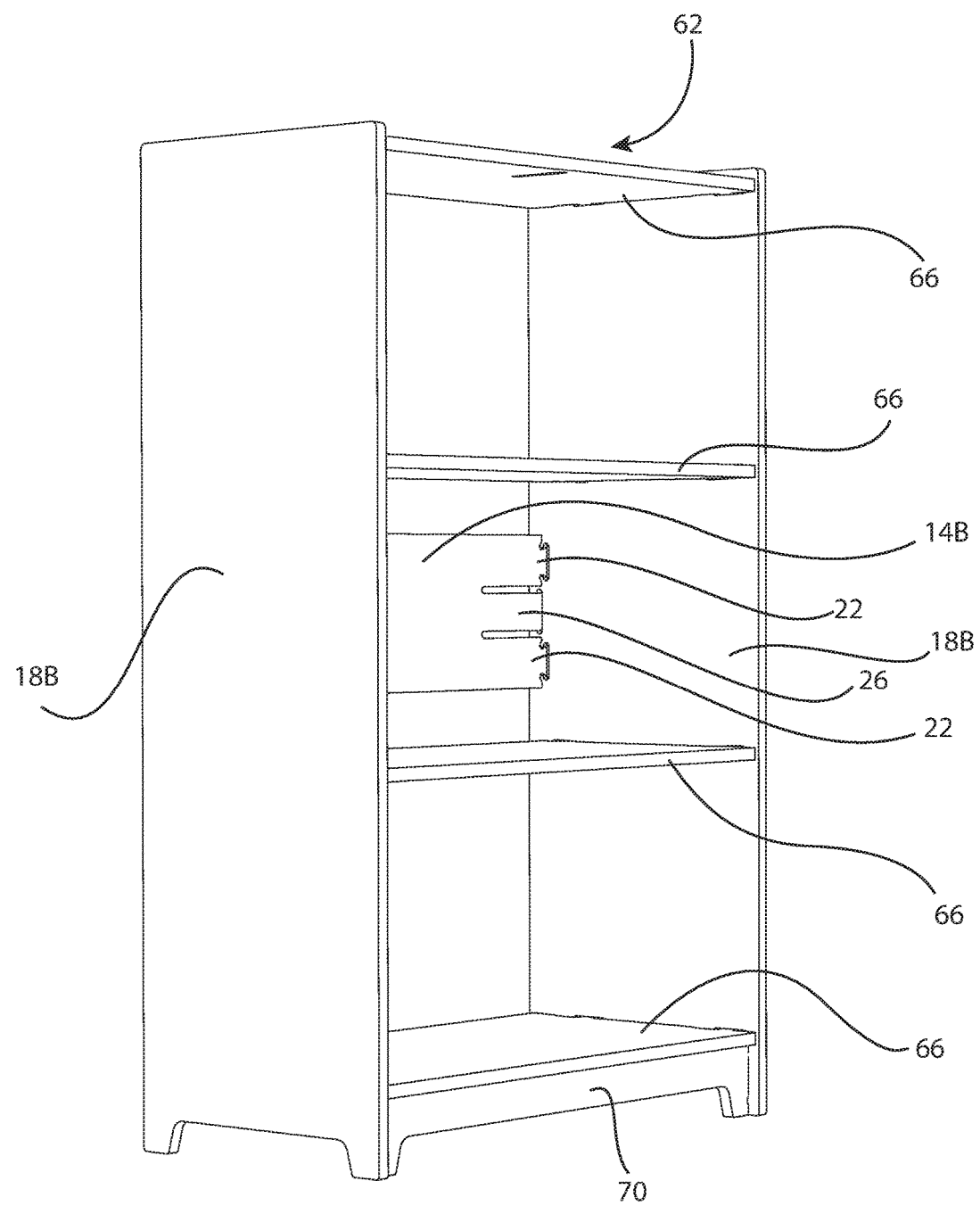
FIG. 8 shows a perspective drawing of a bookcase with a furniture joint according to the present invention.

FIG. 8 shows a perspective front view of a bookcase 62 which uses the furniture joint to join the back panel with the side panels of the bookcase. The bookcase 62 illustrates how the furniture joint may be used in a variety of furniture cabinets such as desks, cubbies, etc. The furniture joint functions as is described above. The furniture joint is used to join a first panel 14A (the back panel) to a second panel 18A (the side panel) of the bookcase 62. The bookcase also includes shelf panels 66 and a kick panel 70. While the bookcase 62 is shown with a single back panel 14B, it may also be formed with two back panels 14B between the first and second shelf panels 66 and the third and fourth shelf panels 66 and may also be formed with three back panels 14B between the first and second, second and third, and third and fourth shelf panels 66. Additional back panels 14B create additional steps in assembling the bookcase 62 and strengthen the bookcase 62 significantly.

While only one side of the back panel 14B is visible, both sides of the back panel 14B are attached to the adjacent side panel 18B with dovetail tabs 22 and a flexed tab 26.

Figure 9:
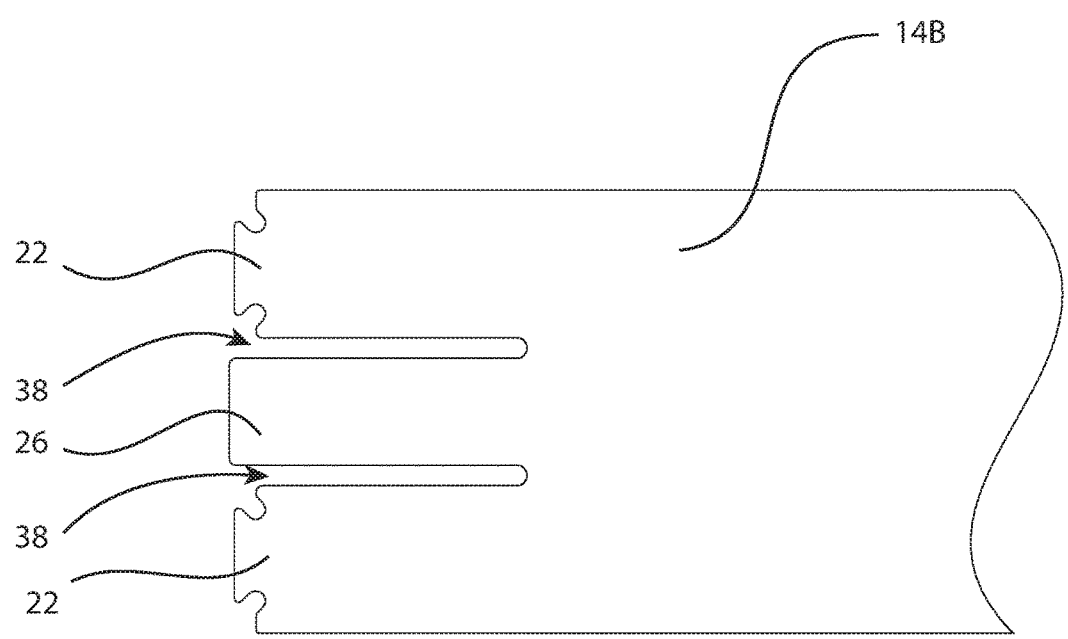
FIG. 9 shows a partial front view of the back panel of the bookcase.

FIG. 9 shows a cutaway view of a portion of the back panel 14B of the bookcase 62. The dovetail tabs 22 and the straight (flexed) tab 26 formed on the left side of the back panel 14B engage slots 30, 34 formed on the side panel 18B as described above. Slots 38 are formed between the dovetail tabs 22 and the straight tab 26. The slots 38 typically extend through the side panel 14 completely and the length of the slots 38 determines the flexibility of the straight tab 26 and determines the resulting stiffness of the joint.

Figure 10:
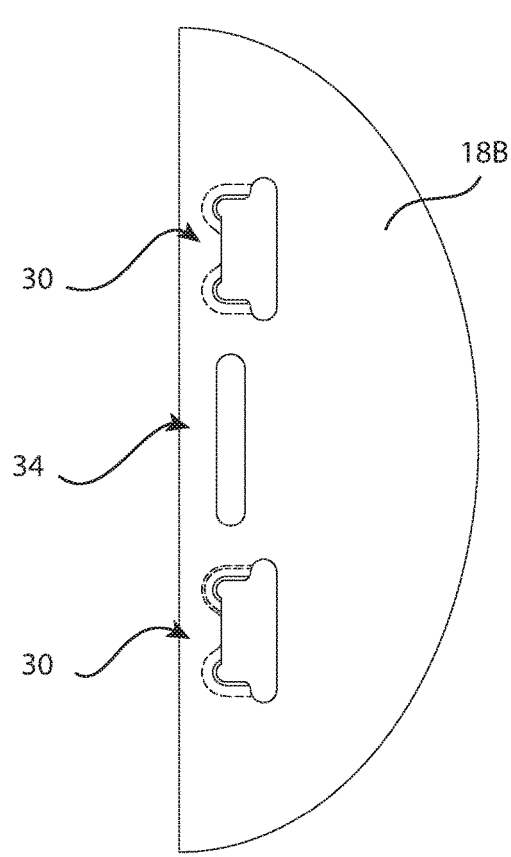
FIG. 10 shows a partial side view of the side panel of the bookcase.

FIG. 10 shows a cutaway view of a portion of the side panel 18B of the bookcase, with the dovetail slots 30 and the straight slot 34 visible. The dovetail slots 30 and the blind straight slot 34 which receives the flexed tab 26 may be formed as blind slots with respect to both the outside face of the panel 18B and the back edge of the panel 18B by moving the slots 30, 34 away from the rear edge of the bookcase side panel 18B. This strengthens the slots 30, 34 and may improve the cosmetics of the finished article of furniture. Similarly, the drawer front 18 discussed above may be formed with the straight slot 34 and the dovetail slots 30 formed away from and not penetrating the edge of the drawer front panel 18 as shown in FIG. 10. This would move the drawer side panels 14 inwardly from the sides of the drawer front panel 18; providing a side overhang on the drawer front panel 18 which may be cosmetically desired.

Alternatively, the dovetail slots 30 may be cut into the back edges of the side panel 18B and may be open to the back edges as shown above in FIG. 2 above. In this case, the straight slots 34 would be positioned in a similar position with respect to the dovetail slots 30. The straight slot 34 may be cut deeper than necessary to provide clearance between the bottom of the slot 34 and the end of the straight tab 26. Both the dovetail slots 30 and the straight slot 34 may be blind slots that do not penetrate the side face of the side panel 18B for cosmetic reasons. As shown, the dovetail slots 30 may be cut with both a straight bit and a dovetail bit. A straight bit may be used along the open insertion end of the slot 30 (on the right of the slot) as well as the inserted end of the slot (on the left of the slot) while a dovetail bit may be used to cut the sides of the slot.

Figure 11:
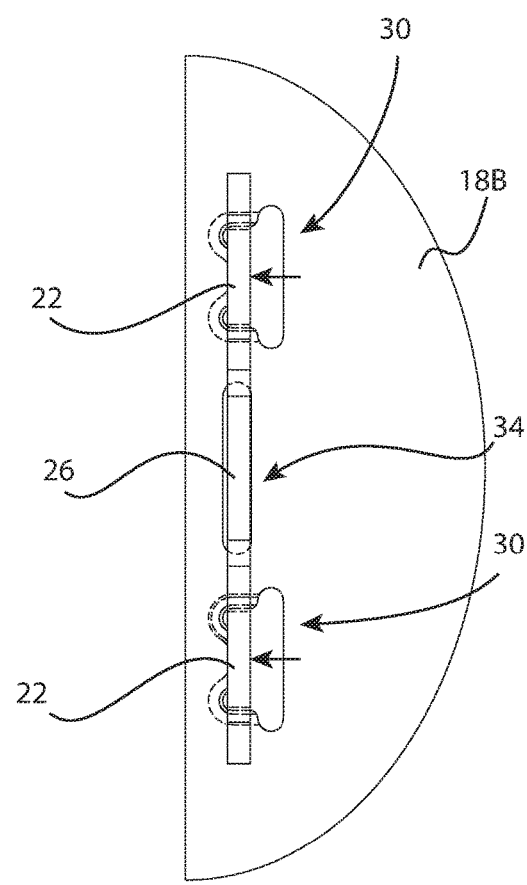
FIG. 11 shows a partial side view of the side panel and back panel of the bookcase.

FIG. 11 shows a cutaway view of a portion of the back panel 14B of the bookcase assembled with one of the side panels 18B of the bookcase 62. For assembly, the tab 26 would be bent to the left relative to the dovetail tabs 22 to allow the tab 26 and the dovetail tabs 26 to be inserted into the respective slots 30, 34. The dovetail tabs 22 are inserted into the open insertion ends of the dovetail slots 30 on the right ends of the slots 30. Afterwards, the flexed tab 26 is allowed to unbend somewhat to allow the dovetail tabs 22 to move to the left and to seat into the left, assembled ends of the dovetail slots 30 where they are captured by the dovetail slots 30 and cannot pull transversely out of the dovetail slots 30 (in a direction out of the page). As mentioned, the back panel 14B may remain with a slight bend in the fully assembled position to keep some tension in the joint and stiffen the bookcase. This positions the tab 26 further to the left than the dovetail tabs 22 as viewed so that the tab 26 is bent out of the plane of the back panel 14B and out of plane with respect to the dovetail tabs 22. This results in an article of furniture which is not wobbly.

Figure 12B:
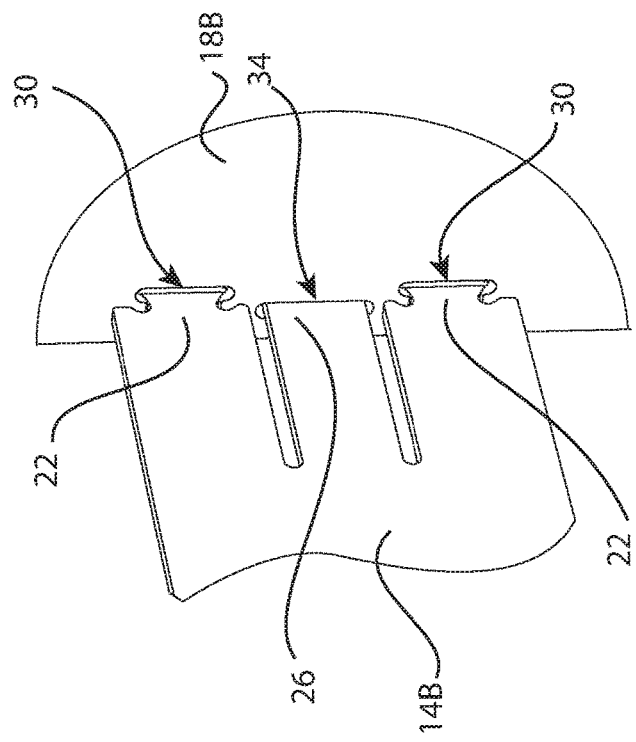
FIG. 12B shows an assembled partial perspective view of the side panel and back panel of the bookcase.
Figure 12A:
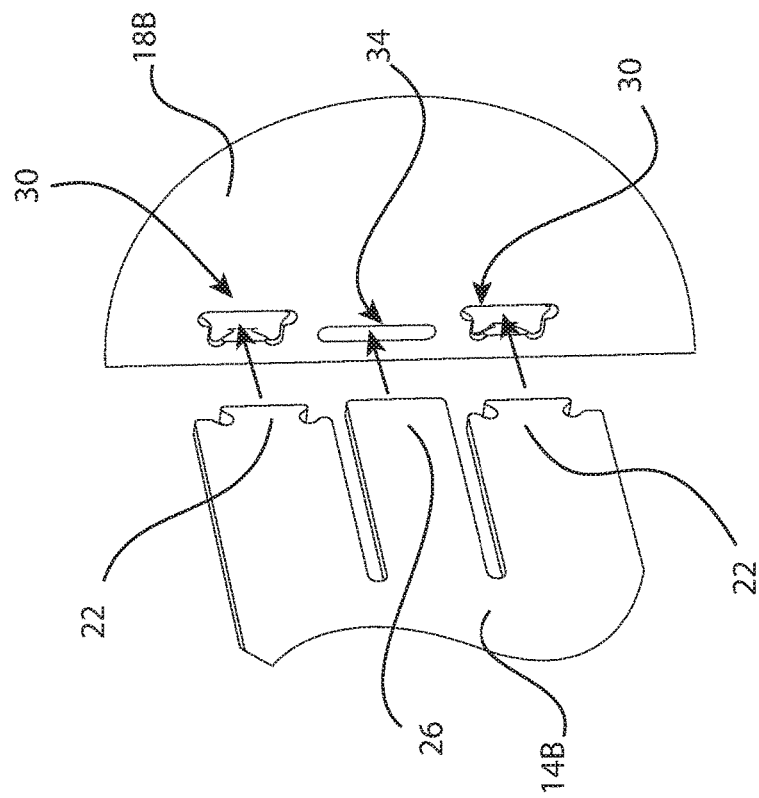
FIG. 12A shows a disassembled partial perspective view of the side panel and back panel of the bookcase.

FIG. 12A shows a partially cutaway perspective view of the back panel 14B before assembly with one of the side panels 18B of the bookcase 62. For assembly, the back panel 14B is brought into alignment with the slots 30, 34 in the side panel 18B as shown. The tab 26 is then bent to the left relative to the dovetail tabs 22 so that the tab 26 may be inserted into the slot 34 while the dovetail tabs 22 are inserted into the open, insertion portions on the right end of the dovetail slots 30. Once the tab 26 and dovetail tabs 22 are seated into the slot 34 and dovetail slots 30, the tab 26 is allowed to unbend relative to the dovetail tabs 22 as the dovetail tabs slide within the dovetail slots 30 towards the left end of the dovetail slots 30. FIG. 12B shows a partially cutaway perspective view of the back panel 14B assembled with one of the side panels 18B of the bookcase 62. In this assembled position the dovetail tabs 22 are positioned in the left, engaging end of the dovetail slots 30 and cannot be removed from the dovetail slots 30 in a direction perpendicular to the side panel 18B. Disassembly of the joint requires the bending of the back panel 14B as the dovetail tabs 22 are moved to the right relative to the tab 26.

Figure 13:
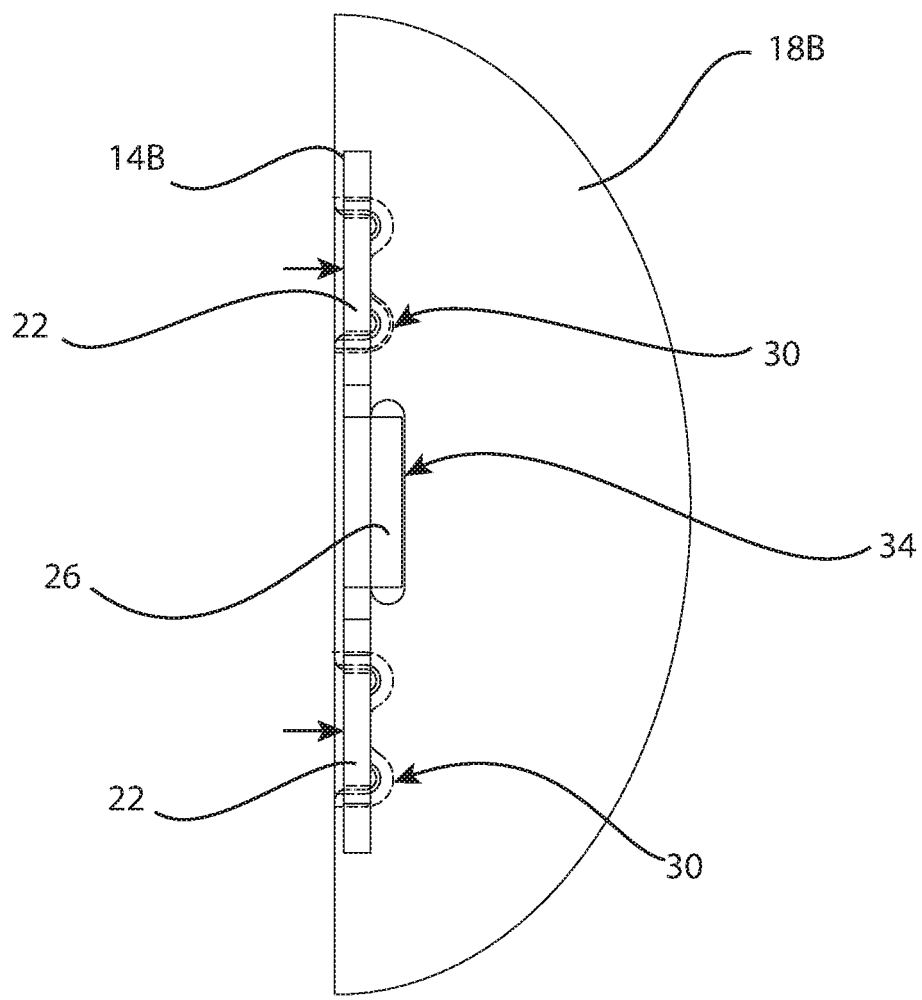
FIG. 13 shows an assembled partial side view of the side panel and back panel of the bookcase.

FIG. 13 shows an alternative embodiment of the furniture joint between the back panel 14B and the side panel 18B as discussed above. The dovetail slots 30 are open to the left side of the side panel 18B and the slot 34 is positioned to the right of the dovetail slots 30 so that the tab 26 is held to the right of the dovetail tabs 22 in the illustrated assembled configuration. The joint is assembled by bending the tab 26 to the right relative to the two dovetail tabs 22, aligning the tab 26 over the slot 34 and the dovetail tabs 22 adjacent the left end opening of the dovetail slots 30, inserting the tab 26 into the slot 34, and allowing the dovetail tabs 22 to move towards the closed right end of the dovetail slots 30 while allowing the tab 26 to unbend relative to the dovetail tabs 22. This design allows the dovetail slots to extend through the back edge of the bookcase side panel 18B.

The furniture joint used between the back panel 14B and the side panels 18B is advantageous as discussed above as it strengthens the bookcase 62 and minimizes slop in the piece of furniture. The joint between the back panel 14B and the side panels 18B does not pop out if the bookcase is racked (skewed sideways; compressed or stretched along a diagonal) where conventional tab and slot joints may pop out under this movement of the bookcase. The joint is also advantageous as it allows a smaller back panel to be used. Conventional tab and slot joints benefit from a larger back panel (typically the entire size of the back of the bookcase) in order to strengthen the bookcase and prevent disassembly if the bookcase is skewed sideways. The present joint, however, provides strength and does not disassemble under these situations with a smaller back panel 14B as shown. As the back panel was the largest panel in the bookcase, the present invention allows a bookcase to be made which has a smaller overall packed/shipping size.

The bookcase 62 is assembled by placing one side panel 18B of the bookcase lying on the floor and placing the end tabs on the top shelf 66, middle shelves 66, bottom shelf 66, and front toe-kick panel 70 into respective slots on the side panel 18B. The tabs 22, 26 on one side of the back panel 14B are inserted into their respective slots 30, 34 on the side panel 18B by flexing the center tab 26 outward and the outside dovetail tabs 22 inward; allowing all three tabs 22, 26 to enter their appropriate slot 30, 34. All the tabs are then allowed to relax and the tabs 22, 26 seat into the slots 30, 34. The opposite side panel 18B is then laid on top of the shelves 66 and panels 70, 14B. Starting on one side and moving to the other; the tabs of the shelves 66 and panels 14B, 70 are lined up with the appropriate slots in the side panel 18B. This includes bending the tabs 22, 26 on the other side of the back panel 14B to allow them to enter the slots 30, 34 on the side panel 18B. Once every tab is lined up with its slot on the side panel 18B, the tabs can then enter their slots fully. The top and bottom shelves 66 may include locking tabs and slots and may be tightened in their slots by laying the bookcase 62 on its front, and pushing down on the shelves 66 until they are flush with the side panels 18B of the bookcase 62. The bookcase can now be stood up in its normal orientation. The bookcase is prevented from being bent out of square by the back panel 14B. If desired, the bookcase 62 may be constructed with two or three back panels 14B to increase the rigidity of the assembled bookcase 62.

Figure 14:
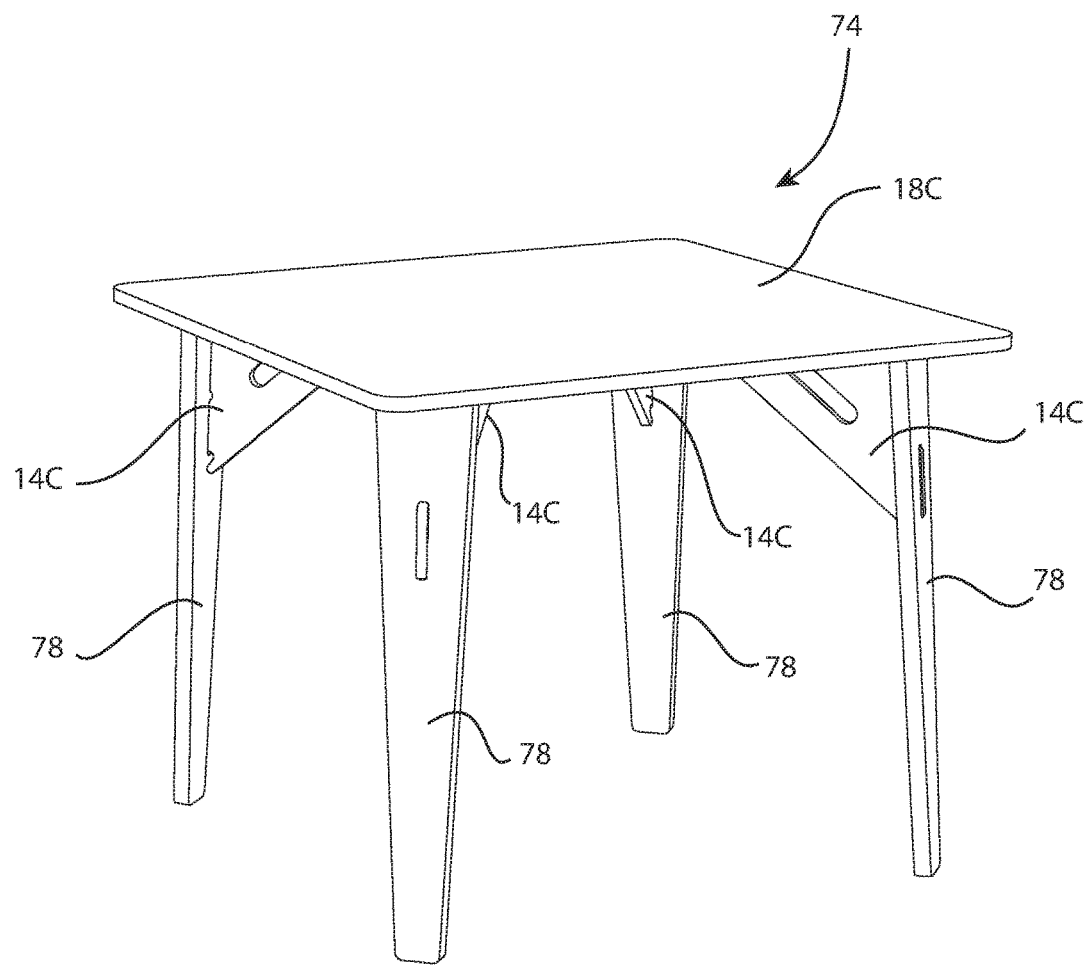
FIG. 14 shows a perspective drawing of a table with a furniture joint according to the present invention.

FIG. 14 shows a perspective view of a table 74 which uses the furniture joint to join a first panel 14C (typically a table leg brace) to a second panel 18C (the table top). The table 74 typically includes a single table top 18C, three or four table legs 78, and three or four leg braces 14C. The furniture joint is beneficial in attaching the leg brace 14C to the top 18C as is easy to assemble and provides a secure joint which is not accidentally disassembled if bumped by a person's legs. The furniture joint may also be used between the table legs 78 and the table top 18C by providing dovetail tabs and a straight tab on the leg 78 and dovetail slots 30 and a straight slot 34 on the table top as described above. In some table designs, the leg 78 is made from thicker material and is attached to the table top 18C without using the furniture joint described due to the stiffness of the material. The table 74 is shown as a square table with four legs. It will be appreciated that a differently shaped table, such as a round table, may use a different number of legs and may position the legs differently with respect to the table top. The joints between the table top 18C and the legs 78 and leg braces 14C may be similar for different table designs.

Figure 15:
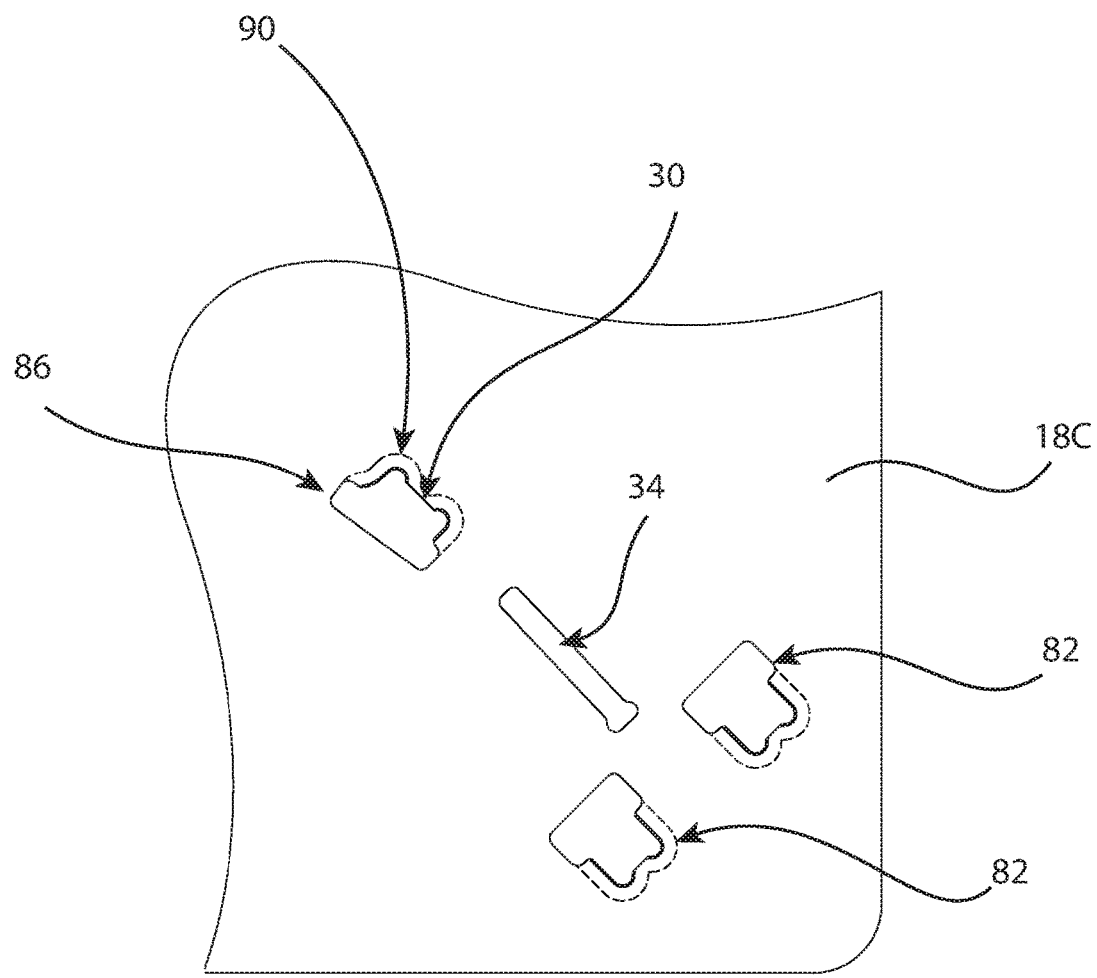
FIG. 15 shows a partial bottom view of the table top panel of the table.

FIG. 15 shows a bottom view of the table top 18C. The table top includes a dovetail slot 30, a straight slot 34, and two dovetail slots 82. All of the slots 30, 34, 82 may be blind slots that do not extend through the thickness of the table top. The dovetail slots 82 are positioned along a 45 degree angle relative to an edge of the table top. A leg 78 is attached to the top with the two dovetail slots 82 and would be positioned in a corner of the table top at a 45 degree angle as shown in FIG. 14. The slot 34 and dovetail slot 30 are disposed along a line which is generally perpendicular to a line through the dovetail slots 82. A leg brace 14C may be attached to the table top with the straight slot 34 and the dovetail slot 30 so that the leg brace 14C is disposed generally perpendicular to the leg 78. It can be seen how the dovetail slot 30 and slot 34 are not completely perpendicular to the dovetail slots 82.

The dovetail slot 30 is formed with an open insertion end 86 and a closed retention end 90 as is common with the other dovetail slots described herein. The closed retention end 90 may be located slightly out of alignment with the slot 34 so that, when fully assembled, a dovetail tab 22 on the leg brace 14C is held slightly out of alignment with a tab 26 on the leg brace to maintain some flexing in the leg brace 14C and a degree of tension in the assembled joint. The open insertion end 86 extends away from the retention end 90 in the same direction that the retention end 90 is displaced from the slot 34. This requires that the dovetail tab 22 is displaced from the straight tab 34 while the dovetail tab 22 and the tab 26 are inserted into the dovetail slot 30 and straight slot 34 and allows the dovetail tab 22 to move into the retention end 90 of the dovetail slot 30 as the leg brace panel 14C is unbent. This configuration also keeps a small degree of bending in the leg brace panel 14C. The open insertion end 86 and the closed retention end 90 of the dovetail slot 30 and the functionality thereof are common to other dovetail slots discussed herein.

FIG. 16 shows a side view of the leg brace 14C. The leg brace 14C includes a dovetail tab 22 and a straight tab 26 which engage the dovetail slot 30 and the slot 34 on the table top 18C. A slot 38 is formed between the dovetail tab 22 and tab 26 to control the flexibility of the panel 14C and the ease with which the dovetail tab 22 and tab 26 may be flexed and moved with respect to each other for assembly of the joint. The leg brace 14C also includes a tab 94 and notch 98 which engage the table leg 78 to secure the leg brace 14C to the table leg 78.

FIGS. 17A and 17B show front and side views of the table leg 78. The leg 78 has two dovetail tabs 102 which enter and slide laterally into dovetail slots 82 on the table top 18C and are captured in the dovetail slots 82. The leg 78 is held in an assembled configuration in the dovetail slots 82 by the leg brace 14C as the leg brace 14C keeps the leg 78 from moving laterally out of the dovetail slots 82. The leg 78 also includes a slot 106 which receives tab 94 on the leg brace 14C. As is shown in FIG. 17B, the slot 106 may have a sloped lower end which assists in receiving the tab 94.

FIGS. 18A, 18B, and 18C show front views of the leg 78 and table top 18C illustrating the attachment of the leg 78 to the table top 18C. The dovetail tabs 102 are inserted transversely into open insertion ends of the dovetail slots 82 until the leg 78 is in the position shown in FIG. 18B. The leg 78 is then moved so that the dovetail tabs 102 move along the slot 82 to the closed retaining end of the dovetail slot 82 as is shown in FIG. 18C. This is the first step in attaching a table leg 18 to the table top 18C.

FIGS. 19A and 19B and then FIGS. 20A and 20B show perspective and cross-sectional views of the leg 78, leg brace 14C, and table top 18C and illustrate steps in attaching the leg brace 14C to the leg 78. The leg brace 14C has been attached to the leg 78 by first pivoting the leg brace 14C counterclockwise to the position shown in FIGS. 19A and 19B. The pointed upper end of the leg brace tab 94 is then inserted into the leg slot 106. The leg brace 14C is then pivoted clockwise into the position shown in FIGS. 20A and 20B. Further pivoting the leg brace 14C clockwise will partially place the tab 26 into the slot 34 as is shown in FIG. 21. At the point shown, the dovetail tab 22 is located near the retaining portion of the dovetail slot 30 and will not enter the dovetail slot 30.

FIGS. 22A and 22B show bottom and cross-sectional views of the leg 78, leg brace 14C, and table top 18C right before the dovetail tab 22 is flexed laterally relative to the tab 26 to allow entry into the dovetail slot 30 and slot 34. The dovetail tab 22 is then moved (into the page) relative to the tab 26 to position the dovetail tab 22 over the open insertion portion of the slot 30. The dovetail tab 22 is then inserted into the dovetail slot insertion portion.

FIGS. 23A and 23B show bottom and cross-sectional views of the leg 78, leg brace 14C, and table top 18C with the dovetail tab 22 flexed relative to the tab 26 and inserted into the insertion portion of the dovetail slot 30. The leg brace 14C is flexed as shown to accomplish this step of insertion. The leg brace 14C is then allowed to unbend as the dovetail tab 22 moves laterally in the dovetail slot 30 to place the dovetail tab 22 in the retaining portion of the dovetail slot 10. This is shown in FIGS. 24A and 24B which show bottom and cross-sectional views of the leg 78, leg brace 14C, and table top 18C in the assembled configuration. The leg brace 14C may remain partially flexed in this position to apply some tension to the joint and stiffen the table against wobbling. FIG. 25 shows a perspective view of the leg 78, leg brace 14C, and table top 18C, in this assembled configuration. The remaining table legs 78 and leg braces 14C would be attached to each other and to the table top 18C in like manner.

The table 74 is assembled by placing the table top 18C upside down on the ground. The tab 94 on the brace 14C is inserted into the hole 106 in the leg 78. The tab 94 enters the smaller side of the hole 106, with the brace panel 14C oriented towards the large tabbed end of the leg 78. The tabs 102 on the large end of the leg 78 are inserted into their appropriate slots 82 on the tabletop 18C, entering the open insertion end of the slots 82 and then sliding into the opposite retaining end of the slots 82. The brace panel 14C is rotated into the position shown in FIG. 20A. The dovetail tab 22 of the leg brace 14C is bent sideways so that the dovetail tab 22 may be placed into its respective dovetail slot 30 through the open insertion end of the slot 30 as shown in FIGS. 23A and 23B. The dovetail tab 22 of the leg brace 14C is then allowed to unbend and enter the retaining end of the dovetail slot 30 such that the overhanging parts of the tab 22 slide under the overhung section of the slot 30 as is shown in FIGS. 24A and 24B. These assembly steps are repeated for the other table legs 78 and leg braces 14C.

Variations on the furniture joint may be made by switching the position of the dovetail tab 22 with the tab 26 (as well as positions of the corresponding dovetail slot 30 and slot 34). Additional variations of the furniture joint may be made by varying the shape of the dovetail tab and slot. A dovetail tab and slot have been discussed herein as they are well suited for plywood furniture panels. Other slot and tab shapes, however also work in the manner discussed herein. For example, round and square sectioned key slots also work as described herein as they accept a tab with a narrowed neck and larger head portion in a correspondingly shaped slot that does not permit the tab to move transversely out of the retaining portion of the slot. These tab and slot shapes work as described above and may be substituted into the pieces of furniture described above.

FIGS. 26A and 26B show a partial cross-sectional view and a side view of the first panel 14D and second panel 18D for an alternative embodiment of the furniture joint. The furniture joint includes a first panel 14D which includes a single centered dovetail tab 22 and two straight tabs 26. Elongated slots 38 are formed between the dovetail tab 22 and the straight tabs 26. The first panel 14D is attached to a second panel 18D which includes a dovetail slot 30 and two straight slots 34. The second panel 18D is shown in cross-section to illustrate the shape of the slots 30, 34 and would be formed in a manner similar to the second panels 18B shown in FIG. 10 or in FIG. 13; rearranging the number and sequence of dovetail slots 30 and straight slots 34. The dovetail tab 22 and the straight tabs 26 are elastically bent out of the plane of the first panel 14D in assembling the joint as discussed previously to allow insertion into the dovetail slot 30 and straight slots 34. The first panel 14D is then unbent to allow the dovetail tab 22 to seat into the retaining portion of the dovetail slot 30 as is discussed above. This version of the furniture joint could be better suited for panels with a very narrow width, such as a shallow drawer side panel.

FIGS. 27A and 27B show a partial cross-sectional view and a side view of the first panel 14E and second panel 18E for an alternative embodiment of the furniture joint. The first panel 14E includes two dovetail tabs 30 which have an overhang (elongated head portion) on the inside face of the tab 30 and straight edges on the outside face of the tab 30. The first panel 14E includes a straight tab 26 and includes elongates slots 38 between the dovetail tabs 22 and the straight tab 26. The second panel 18E is shown in cross-section to illustrate the shape of the slots 30, 34 and would be formed in a manner similar to the second panels 18B shown in FIG. 10 or in FIG. 13; modifying the shape of the slots to correspond to the modified shape of the tabs. This version of the furniture joint could also be better suited for panels with a very narrow width, such as a shallow drawer side panel.

FIGS. 28A and 28B show a partial cross-sectional view and a side view of the first panel 14F and second panel 18F for an alternative embodiment of the furniture joint. The furniture joint includes a first panel 14F which includes two dovetail tabs 22 and a straight tab 26. Elongated slots 38 are formed between the dovetail tabs 22 and the straight tab 26. The first panel 14F is attached to a second panel 18F which includes two dovetail slots 30 and a straight slot 34. The second panel 18F is shown in cross-section to illustrate the shape of the slots 30, 34 and would be formed in a manner similar to the second panels 18B shown in FIG. 10 or in FIG. 13; arranging the dovetail slots 30 and straight slot 34 to match the configuration of the dovetail tabs 22 and straight tab 26. The dovetail tab 22 and the straight tabs 26 are elastically bent out of the plane of the first panel 14D in assembling the joint as discussed previously to allow insertion into the dovetail slot 30 and straight slots 34. The first panel 14D is then unbent to allow the dovetail tab 22 to seat into the retaining portion of the dovetail slot 30 as is discussed above.

FIGS. 29A and 29B show a partial cross-sectional view and a side view of the first panel 14G and second panel 18G for an alternative embodiment of the furniture joint which is similar to that of FIGS. 28A and 28B and which replaces dovetail shaped tabs and slots with T-shaped tabs and slots. The furniture joint includes a first panel 14G which includes two T-shaped tabs 22B and a straight tab 26. Elongated slots 38 are formed between the T-shaped tabs 22B and the straight tab 26. The first panel 14G is attached to a second panel 18G which includes two T-shaped slots 30B and a straight slot 34. The second panel 18G is shown in cross-section to illustrate the shape of the slots 30B, 34 and would be formed in a manner similar to the second panels 18B shown in FIG. 10 or in FIG. 13; modifying the dovetail slots 30 and straight slots 34 to match the shape and configuration of the T-shaped tabs 22B and the tab 26. The T-shaped tabs 22B and the straight tab 26 are elastically bent out of the plane of the first panel 14G in assembling the joint as discussed previously to allow insertion into the T-shaped slots 30B and straight slot 34. The first panel 14G is then unbent to allow the T-shaped tab 22B to seat into the retaining portion of the T-shaped slot 30B as is discussed above. The T-shaped tabs 22B and slots 30B function in like manner as the dovetail tabs 22 and slots 30. The tabs both include an enlarged head portion and the slots are both formed with an open insertion portion and a closed retaining portion which prevents the tab from being pulled out of the slot in a direction perpendicular to the slot/panel.

FIGS. 30A and 30B show a partial cross-sectional view and a side view of the first panel 14H and second panel 18H for an alternative embodiment of the furniture joint. The furniture joint includes a first panel 14H which includes a single centered dovetail tab 22 and two straight tabs 26. Elongated slots 38 are formed between the dovetail tab 22 and the straight tabs 26. The first panel 14H is attached to a second panel 18H which includes a dovetail slot 30 and two straight slots 34. The second panel 18H is shown in cross-section to illustrate the shape of the slots 30, 34 and would be formed in a manner similar to the second panels 18B shown in FIG. 10 or in FIG. 13; rearranging the number and sequence of dovetail slots 30 and straight slots 34. The dovetail tab 22 and the straight tabs 26 are elastically bent out of the plane of the first panel 14H in assembling the joint as discussed previously to allow insertion into the dovetail slot 30 and straight slots 34. The first panel 14H is then unbent to allow the dovetail tab 22 to seat into the retaining portion of the dovetail slot 30 as is discussed above.

FIGS. 31A and 31B show a partial cross-sectional view and a side view of the first panel 14J and second panel 18J for an alternative embodiment of the furniture joint which is similar to that of FIGS. 28A and 28B and which replaces dovetail shaped tabs and slots with T-shaped tabs and slots. The furniture joint includes a first panel 14J which includes a single T-shaped tab 22B and two straight tabs 26. Elongated slots 38 are formed between the T-shaped tab 22B and the straight tabs 26. The first panel 14J is attached to a second panel 18J which includes a T-shaped slot 30B and two straight slots 34. The second panel 18J is shown in cross-section to illustrate the shape of the slots 30B, 34 and would be formed in a manner similar to the second panels 18B shown in FIG. 10 or in FIG. 13; modifying the dovetail slots 30 and straight slots 34 to match the shape and configuration of the T-shaped tab 22B and the tabs 26. The T-shaped tab 22B and the straight tabs 26 are elastically bent out of the plane of the first panel 14J in assembling the joint as discussed previously to allow insertion into the T-shaped slot 30B and straight slots 34. The first panel 14J is then unbent to allow the T-shaped tab 22B to seat into the retaining portion of the T-shaped slot 30B as is discussed above. The T-shaped tab 22B and slot 30B function in like manner as the dovetail tabs 22 and slots 30. The tab includes an enlarged head portion and the slot is formed with an open insertion portion and a closed retaining portion which prevents the tab from being pulled out of the slot in a direction perpendicular to the slot/panel.

FIGS. 32A and 32B as well as FIGS. 33A and 33B show partial cross-sectional views and side views of the first panel 14K and second panel 18K for an alternative embodiment of the furniture joint. The first panel 14K includes two dovetail tabs 22 and a center straight tab 26. The second panel 18K includes two dovetail slots 30 and a straight slot 34. These figures illustrate how the dovetail tabs 22 and dovetail slots 30 may be formed with a dovetail shape on the outside edges and a straight shape on the inside edges. The second panel 18K is formed with dovetail slots 30 which are open to the edge of the second panel 18K and a straight slot 34 which is located further inward from the panel edge and is not open to the edge of the second panel 18K. The straight slot 34 is offset somewhat from the dovetail slots 30 as it is located further inward from the panel edge than the inner end (the retaining portion) of the dovetail slots 30. This causes the straight tab 26 to be flexed slightly inward relative to the dovetail tabs 22 when the joint is assembled. The joint may be assembled by placing one dovetail tab 22 into the open edge of the corresponding dovetail slot 30 and placing the straight tab 26 into the straight slot 34. The remaining dovetail tab 22 is then flexed in order to place it into the remaining dovetail slot 30 through the open edge of the slot. For example, the top dovetail tab 22 is flexed out of the page until it can be placed into the top dovetail slot 30 through the open edge of the slot. The dovetail tab 22 is then released and the flexural tension in the tabs 22, 26 draws the dovetail tab 22 into the dovetail slot 30. The straight tab 26 and dovetail tabs 22 may remain in tension, with the straight tab 26 remaining bent into the page slightly relative to the dovetail tabs 22.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example are provided for explanation purposes and that other values may also be employed in other examples in accordance with the teachings of the present invention.

What is claimed is:

1. An article of modular furniture comprising:
   a first panel comprising a first tab and a second tab;
   wherein the second tab comprises a neck portion and an enlarged distal end which extends laterally beyond the neck portion;
   a second panel comprising a first slot and a second slot;
   wherein the second slot includes an open insertion portion and a retaining portion having a narrowed opening and an enlarged section;
   wherein the second tab is located in the second slot such that the second tab neck portion is disposed in the second slot narrowed opening and the second tab enlarged distal end is disposed in the second slot enlarged section such that the second tab cannot be removed from the second slot in a direction perpendicular to the second panel;
   wherein the first tab is located in the first slot;
   wherein the first panel is disposed generally perpendicular to the second panel;
   wherein the open insertion portion of the second slot is disposed in non-linear alignment with the first slot so that the first panel must be flexed to displace the first tab with respect to the second tab in order to insert the first tab into the first slot and the second tab into the insertion portion of the second slot; and
   wherein the first panel is un-flexed after positioning the first tab into the first slot and the second tab in to the second slot whereby the second tab moves from the second slot insertion portion into the second slot retaining portion and is held captive in the second slot.

2. The article of modular furniture of claim 1, wherein the retaining portion of the second slot is disposed in non-linear alignment with the first slot so that the first panel is maintained in a flexed configuration when the article of furniture is in an assembled configuration.

3. The article of modular furniture of claim 1, wherein the first panel further comprises a slot disposed between the first tab and the second tab which extends a distance into the panel away from the first tab and the second tab to allow the first tab to be displaced from the second tab.

4. The article of modular furniture of claim 3, wherein the slot extends a distance into the first panel which is about five times a length of the first tab.

5. The article of modular furniture of claim 1, wherein the first panel forms the side of a drawer and the second panel forms the front of a drawer.

6. The article of modular furniture of claim 1, wherein the first panel forms the back of a cabinet and the second panel forms the side of a cabinet.

7. The article of modular furniture of claim 1, wherein the first tab is a straight tab and wherein the first slot is a straight slot.

8. The article of modular furniture of claim 1, wherein the second tab is a dovetail tab and wherein the second slot retaining portion is a dovetail shape.

9. The article of modular furniture of claim 1, wherein the second tab is a T-shaped tab and wherein the second slot retaining portion is a T-shaped slot.

10. The article of modular furniture of claim 1, further comprising a third panel which is attached to the first panel and the second panel.

11. The article of modular furniture of claim 10, wherein the third panel defines a support surface which supports an item placed thereupon by a user.

12. The article of modular furniture of claim 1, wherein:
the first panel further comprises a third tab comprising a neck portion and an enlarged distal end which extends laterally beyond the neck portion;
the second panel comprises a third slot which includes an open insertion portion and a retaining portion having a narrowed opening and an enlarged section;
wherein the third tab is located in the third slot such that the third tab neck portion is disposed in the third slot narrowed opening and the third tab enlarged distal end is disposed in the third slot enlarged section such that the third tab cannot be removed from the third slot in a direction perpendicular to the second panel;
wherein the open insertion portion of the third slot is disposed in non-linear alignment with the first slot so that the first panel must be flexed to displace the first tab with respect to the third tab in order to insert the third tab into the insertion portion of the third slot; and
wherein the first panel is un-flexed after positioning the third tab into third slot whereby the third tab moves from the third slot insertion portion into the third slot retaining portion and is held captive in the third slot.

13. The article of modular furniture of claim 12, wherein the first tab is disposed between the second tab and the third tab.

14. The article of modular furniture of claim 1, wherein:
the first panel comprises a third tab;
the second panel comprises a third slot;
wherein the third tab is located in the third slot; and
wherein the open insertion portion of the second slot is disposed in non-linear alignment with the first slot and the third slot so that the first panel must be flexed to displace the first tab and the third tab with respect to the second tab in order to insert the first tab into the first slot, the second tab into the insertion portion of the second slot, and the third tab into the third slot.

15. An article of modular furniture comprising:
a first panel comprising a first tab and a second tab;
wherein the second tab comprises a neck portion and an enlarged distal end which extends laterally beyond the neck portion;
a second panel comprising a first slot and a second slot;
wherein the second slot includes an open insertion portion and a retaining portion;
wherein the second tab is located in the retaining portion of the second slot such that the second tab cannot be removed from the second slot in a direction perpendicular to the second panel;
wherein the first tab is located in the first slot;
wherein the open insertion portion of the second slot is disposed in non-linear alignment with the first slot so that the first panel must be flexed to displace the first tab with respect to the second tab in order to insert the first tab into the first slot and the second tab into the insertion portion of the second slot; and
wherein the first panel is un-flexed after positioning the first tab into the first slot and the second tab in to the second slot insertion portion whereby the second tab moves from the second slot insertion portion into the second slot retaining portion and is held captive in the second slot.

16. The article of modular furniture of claim 15, wherein the retaining portion of the second slot is disposed in non-linear alignment with the first slot so that the first panel is maintained in a flexed configuration when the article of furniture is in an assembled configuration.

17. The article of modular furniture of claim 15, wherein the first panel further comprises a slot disposed between the first tab and the second tab which extends a distance into the panel away from the first tab and the second tab to increase the flexibility of the first panel and allow the first tab to be more easily displaced from the second tab.

18. The article of modular furniture of claim 15, wherein:
the first panel further comprises a third tab comprising a neck portion and an enlarged distal end which extends laterally beyond the neck portion;
the second panel comprises a third slot which includes an open insertion portion and a retaining portion;
wherein the third tab is located in the third slot retaining portion such that the third tab cannot be removed from the third slot in a direction perpendicular to the second panel;
wherein the open insertion portion of the third slot is disposed in non-linear alignment with the first slot so that the first panel must be flexed to displace the first tab with respect to the third tab in order to insert the third tab into the insertion portion of the third slot; and
wherein the first panel is un-flexed after positioning the third tab into third slot insertion portion whereby the third tab moves from the third slot insertion portion into the third slot retaining portion and is held captive in the third slot.

19. The article of modular furniture of claim 18, wherein the first tab is disposed between the second tab and the third tab.

20. The article of modular furniture of claim 15, wherein:
the first panel comprises a third tab;
the second panel comprises a third slot;
wherein the third tab is located in the third slot; and
wherein the open insertion portion of the second slot is disposed in non-linear alignment with the first slot and the third slot so that the first panel must be flexed to displace the first tab and the third tab with respect to the second tab in order to insert the first tab into the first slot, the second tab into the insertion portion of the second slot, and the third tab into the third slot.

* * * * *